US011729492B2

(12) United States Patent
Seike et al.

(10) Patent No.: US 11,729,492 B2
(45) Date of Patent: Aug. 15, 2023

(54) IMAGE GENERATION DEVICE AND IMAGE GENERATION METHOD

(71) Applicants: MITSUI O.S.K. LINES, LTD., Tokyo (JP); FURUNO ELECTRIC CO., LTD., Nishinomiya (JP)

(72) Inventors: Yasuyuki Seike, Tokyo (JP); Takanori Hisajima, Tokyo (JP); Noriyuki Tomono, Tokyo (JP); Ken Hasegawa, Tokyo (JP); Koji Nishiyama, Tokyo (JP)

(73) Assignees: MITSUI O.S.K. LINES, LTD., Tokyo (JP); FURUNO ELECTRIC CO., LTD., Hyogo (JP)

( * ) Notice: Subject to any disclaimer, the term of this patent is extended or adjusted under 35 U.S.C. 154(b) by 86 days.

(21) Appl. No.: 17/186,211

(22) Filed: Feb. 26, 2021

(65) Prior Publication Data
US 2021/0185238 A1 Jun. 17, 2021

Related U.S. Application Data

(63) Continuation of application No. PCT/JP2019/034028, filed on Aug. 29, 2019.

(30) Foreign Application Priority Data

Aug. 30, 2018 (JP) ................................ 2018-161563

(51) Int. Cl.
*H04N 23/63* (2023.01)
*H04N 23/695* (2023.01)
(Continued)

(52) U.S. Cl.
CPC ......... *H04N 23/631* (2023.01); *H04N 23/695* (2023.01); *B63B 49/00* (2013.01); *G06T 19/006* (2013.01)

(58) Field of Classification Search
CPC ......... H04N 5/232933; H04N 5/23299; H04N 7/183; B63B 49/00; G06T 19/006; G06T 2219/004; G08G 3/02
See application file for complete search history.

(56) References Cited

U.S. PATENT DOCUMENTS

2008/0291052 A1* 11/2008 Burns .................... G08G 1/164
340/988
2009/0118998 A1* 5/2009 Chau .................... G08G 5/0082
705/14.27
(Continued)

FOREIGN PATENT DOCUMENTS

CN 101038168 A 9/2007
EP 1320834 A1 6/2003
(Continued)

OTHER PUBLICATIONS

P.C. Van Kluijven et al., "Augmented Reality Used in Navigation", Project 2 Theme: Improvement and Innovation Content, Feb. 5, 2013, XP055199421, Retrieved from the Internet: URL:http://www.maritimesymposium-rotterdam.nl/uploads/Route/Augmented Reality On The Bridge.pdf, Sections 2, 5, 6, and 7, 25 Pages.
(Continued)

*Primary Examiner* — Christopher K Peterson
(74) *Attorney, Agent, or Firm* — Harness, Dickey & Pierce, P.L.C.

(57) ABSTRACT

An image generation device includes an image capturing unit installed on a water moving object, a target information acquisition unit which acquires target information about a target, an augmented image generation unit which generates an augmented image in which the target information acquired by the target information acquisition unit is displayed in a captured image captured by the image capturing unit, a marker display unit which displays a marker for selecting the target by a user such that the marker moves
(Continued)

according to a display place of the target in the augmented image, and a marker moving unit moves the display place of at least one of a plurality of markers so that determination regions which determining that each marker has been selected do not overlap each other.

18 Claims, 13 Drawing Sheets

(51) Int. Cl.
  B63B 49/00    (2006.01)
  G06T 19/00    (2011.01)

(56) References Cited

U.S. PATENT DOCUMENTS

| | | | |
|---|---|---|---|
| 2012/0158287 A1* | 6/2012 | Altamura | G06T 11/00 |
| | | | 701/519 |
| 2014/0160165 A1 | 6/2014 | Kim et al. | |
| 2015/0350552 A1 | 12/2015 | Pryszo et al. | |
| 2019/0061529 A1 | 2/2019 | Saisho et al. | |
| 2020/0089234 A1 | 3/2020 | Nishiyama | |

FOREIGN PATENT DOCUMENTS

| | | |
|---|---|---|
| JP | H6301897 A | 10/1994 |
| JP | 2001281331 A | 10/2001 |
| JP | 2002243495 A | 8/2002 |
| JP | 200561893 A | 3/2005 |
| JP | 2008281504 A | 11/2008 |
| JP | 2012127947 A | 7/2012 |
| JP | 2014529322 A | 11/2014 |
| JP | 2015164006 A | 9/2015 |
| JP | 2018122619 A | 8/2018 |
| WO | 2006137526 A1 | 12/2006 |
| WO | 2017141829 A1 | 8/2017 |

OTHER PUBLICATIONS

Extended European Search Report for corresponding Application No. 19854541.0 dated Apr. 4, 2022 (8 Pages).
International Search Report and Written Opinion regarding International Application No. PCT/JP2019/034028, dated Nov. 12, 2019, with English ISR Translation (8 pages).
Chinese Office Action for Application No. 201980056677.8 (with English translation) dated Nov. 23, 2022 (14 pages).

* cited by examiner

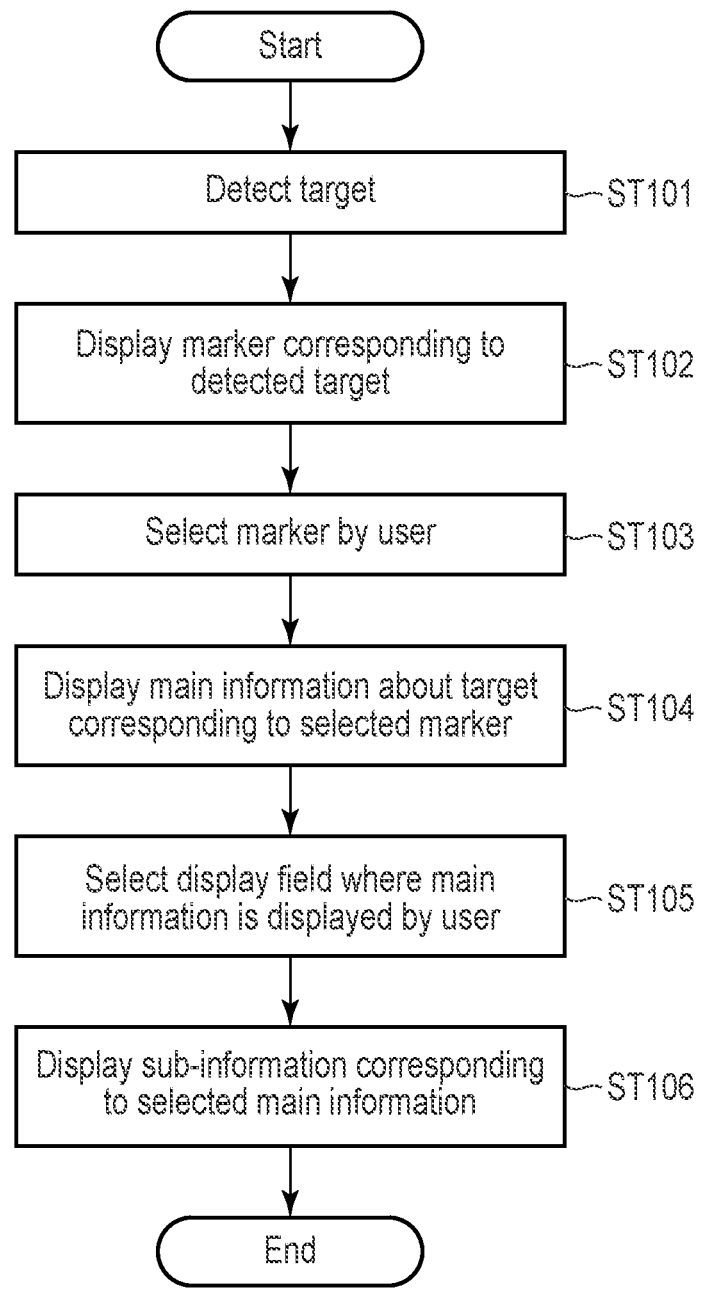
F I G. 12

IMAGE GENERATION DEVICE AND IMAGE GENERATION METHOD

CROSS-REFERENCE TO RELATED APPLICATIONS

This application is a Continuation Application of PCT Application No. PCT/JP2019/034028, filed Aug. 29, 2019 and based upon and claiming the benefit of priority from prior Japanese Patent Application No. 2018-161563, filed Aug. 30, 2018, the entire contents of all of which are incorporated herein by reference.

FIELD

Embodiments described herein relate generally to an image generation device which generates an image including a target.

BACKGROUND

Generally, an image generation device which georeferences an image stream from a camera is disclosed. For example, there is an image generation device which receives stream image data captured by a camera of a ship, acquires the position of a target (another ship or the like) around the ship, and generates an image to be displayed on a display (see US 2015/0350552 A).

However, in order for the ship to navigate, it is necessary to acquire various kinds of information about a target (for example, a water moving object) around the ship. Therefore, when all pieces of information necessary for navigation are simply superimposed on the image captured by the camera of the ship and displayed on the display, the displayed pieces of information are difficult to understand. Therefore, such an image is less convenient.

BRIEF SUMMARY

An object of embodiments described herein is to provide an image generation device which improves convenience by displaying information on an image captured from a ship.

In accordance with an aspect of the embodiments, there is provided an image generation device. the image generation device includes an image capturing unit installed on a water moving object, a target information acquisition unit which acquires target information about a target, an augmented image generation unit which generates an augmented image in which the target information acquired by the target information acquisition unit is displayed in a captured image captured by the image capturing unit, a marker display unit which displays a marker for selecting the target by a user such that the marker moves according to a display place of the target in the augmented image, and a marker moving unit moves the display place of at least one of a plurality of the markers so that determination regions which determining that each marker has been selected do not overlap each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a flow diagram showing an outline of a procedure for displaying the detailed information on the AR image according to the embodiment.

DETAILED DESCRIPTION

Embodiment

Figure 1:
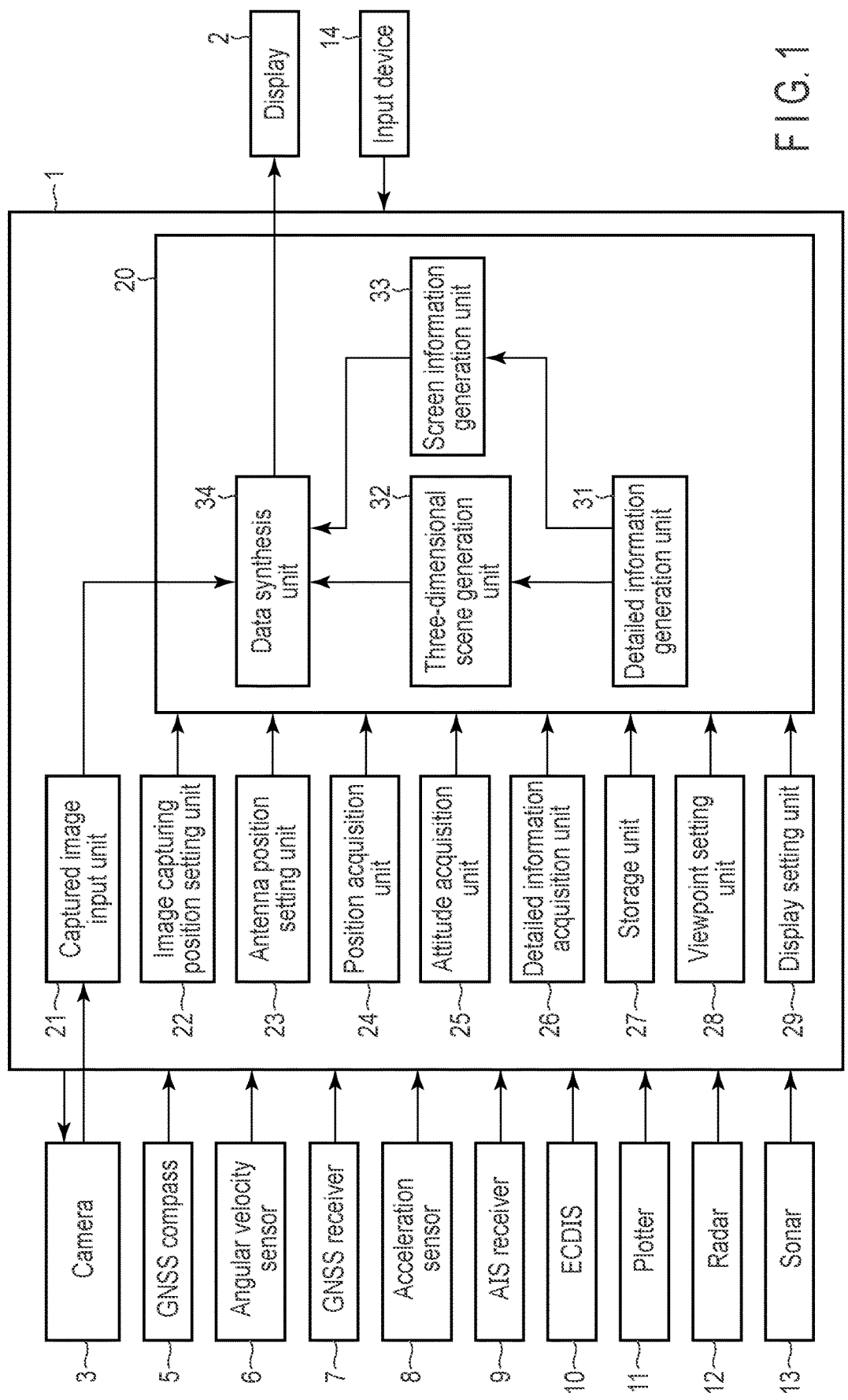
FIG. 1 is a block diagram showing the configuration of an image generation device according to an embodiment.
Figure 2:
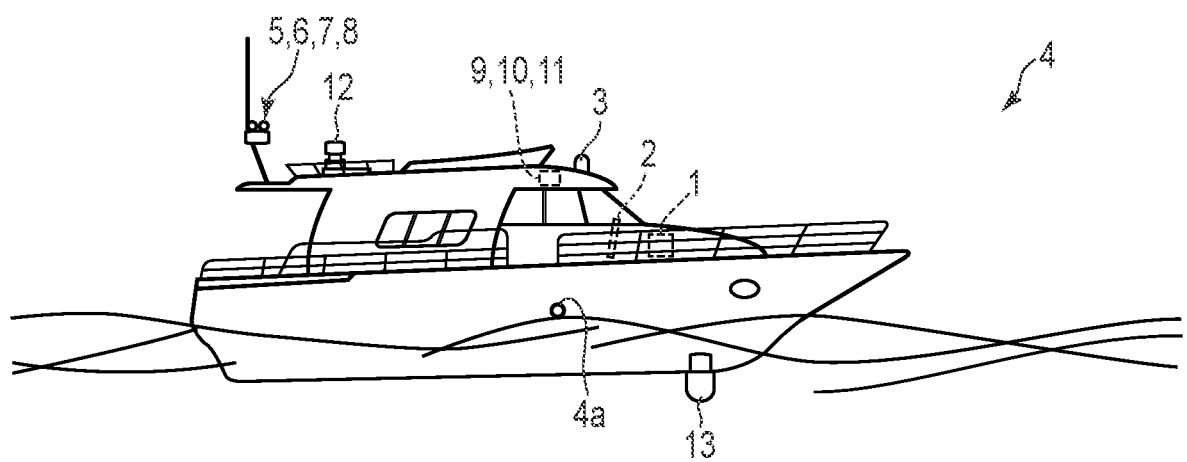
FIG. 2 is a side view showing a side surface of a ship according to the embodiment.

FIG. 1 is a block diagram showing the configuration of an image generation device 1 according to an embodiment. FIG. 2 is a side view showing a side surface of a ship 4 according to the present embodiment. The same portions in the drawings are denoted by the same reference numbers, and explanations of them which are considered redundant are appropriately omitted.

The image generation device 1 is installed on the ship 4 which is a water moving object moving on the water. The ship 4 may be any water moving object as long as it sails on the water of the sea, lake, river or the like. The image generation device 1 generates an augmented reality (AR) image which expands and expresses the situation around the ship 4 by displaying detailed information in an image captured by a camera (imaging capturing device) 3.

Although the generated image is hereinafter explained as an AR image, the generated image may be any image as long as it is an image in which information is added to the captured image.

A display 2 displays the AR image generated by the image generation device 1. For example, the display 2 is provided as a steering support device referred to by an operator who steers the ship 4. Note that the display 2 may be a display of a portable computer carried by a steering assistant who monitors a surrounding situation from the ship 4, a display for passengers to watch in a cabin of the ship 4, a display of a wearable terminal worn by a person on board, or the like.

Next, various devices connected to the image generation device 1 will be explained. FIG. 2 is a side view showing a side surface provide with various devices of the ship 4 according to the present embodiment.

The camera 3 is a wide-angle video camera which captures the image of the situation around the ship 4. The camera 3 has a live output function, and generates moving image data as the image capturing result (image data, stream data or the like) in real time and outputs it to the image generation device 1. The camera 3 is installed on the ship 4 such that the image capturing direction is horizontally forward with respect to the hull. The camera 3 includes a rotation mechanism which performs a rotation operation such as panning or tilting. The camera 3 changes the image capturing direction within a predetermined angle range with reference to the hull of the ship 4 based on a signal indicating the rotation operation input from the image generation device 1. The height and attitude of the ship 4 vary depending on the natural environment such as waves. Along with this, the height and attitude (image capturing direction) of the camera 3 also three-dimensionally change.

The image generation device 1 is connected to a global navigation satellite system (GNSS) compass 5, an angular velocity sensor 6, a GNSS receiver 7, an acceleration sensor 8, an automatic identification system (AIS) receiver 9, an electronic chart display and information system (ECDIS) 10, a plotter 11, a radar 12 and a sonar 13 as ship devices in addition to the camera 3. The ship devices are information sources of detailed information. The angular velocity sensor 6, the GNSS receiver 7 and the acceleration sensor 8 are incorporated in the GNSS compass 5. All or part of the angular velocity sensor 6, the GNSS receiver 7 and the acceleration sensor 8 may be provided independently of the GNSS compass 5. In addition, the ship devices are not limited to those explained here but may be any devices.

The GNSS compass 5 has the functions of a direction sensor and an attitude sensor. The GNSS compass 5 includes a plurality of GNSS antennas (positioning antennas) fixed to the ship 4. The GNSS compass 5 calculates the positional relationship of the respective GNSS antennas based on radio waves received from a positioning satellite. In particular, the GNSS compass 5 acquires the positional relationship of the respective GNSS antennas based on a phase difference of the carrier phases of the radio waves received by the respective GNSS antennas. A method of acquiring the positional relationship of the GNSS antennas can employ a known processing method. Accordingly, the GNSS compass 5 can acquire the bow direction of the ship 4.

The GNSS compass 5 three-dimensionally acquires the attitude of the ship 4. More specifically, the GNSS compass 5 detects not only the bow direction (that is, the yaw angle of the ship 4) but also the roll angle and pitch angle of the ship 4. The attitude information about the ship 4 acquired by the GNSS compass 5 is output to an attitude acquisition unit 25 and other ship devices.

The angular velocity sensor 6 is composed of, for example, a vibration gyro sensor. The angular velocity sensor 6 detects the yaw angular velocity, roll angular velocity and pitch angular velocity of the ship 4 in shorter cycles than detection intervals (for example, 1 second) at which the GNSS compass 5 detects the attitude information. By using the angle detected by the GNSS compass 5 and the integral of the angular velocity detected by the angular velocity sensor 6 together, the attitude of the ship 4 can be acquired at shorter time intervals than when the GNSS compass 5 is used alone. In addition, when the radio wave from a positioning satellite of the GNSS is blocked by, for example, an obstacle such as a bridge and the attitude detection by the GNSS compass 5 cannot be performed, the angular velocity sensor 6 functions as an alternative means of acquiring the attitude information.

The GNSS receiver 7 acquires the position of the ship 4 based on the radio waves received from the positioning satellite by the GNSS antennas. For example, the position of the ship 4 is the latitude, longitude and height of the GNSS antennas. The GNSS receiver 7 outputs the acquired position information to a position acquisition unit 24 and other ship devices.

The acceleration sensor 8 is, for example, a capacitance detection type sensor. The GNSS receiver 7 detects an acceleration on the yaw axis, roll axis and pitch axis of the ship 4 in shorter cycles than detection intervals (for example, 1 second) at which the GNSS receiver 7 detects the position information. By using the position information detected by the GNSS receiver 7 and the double integral of the acceleration detected by the acceleration sensor 8 together, the position of the ship 4 can be acquired at shorter time intervals than when the GNSS receiver 7 is used alone. In addition, when the radio wave from a positioning satellite of the GNSS is blocked and the position detection by the GNSS receiver 7 cannot be performed, the acceleration sensor 8 functions as an alternative means of acquiring the position information.

The AIS receiver 9 is a device for receiving AIS information transmitted from other ships, a land station or the like. The AIS information includes various kinds of information such as information about other ships navigating around the ship 4, positions of landmarks, and identification information. The information about another ship includes, for example, a position (latitude/longitude), a hull length, a hull width, a ship type, identification information, a ship speed, a course, a destination and the like.

The ECDIS 10 acquires the position information about the ship 4 from the GNSS receiver 7 and outputs the information about the situation around the ship 4 to the image generation device 1 based on electronic chart information stored in advance.

The plotter 11 generates information about the navigation track of the ship 4 by continuously acquiring the position of the ship 4 from the GNSS receiver 7. In addition, the plotter 11 generates, by letting the user set a plurality of waypoints (points where the ship 4 is scheduled to pass), a planned route by sequentially connecting these waypoints.

The radar 12 detects a target such as another ship which is present around the ship 4. In addition, the radar 12 has a target tracking function (TT) capable of capturing and tracking a target. The radar 12 acquires the position and velocity vector (TT information) about a target by this TT. The radar 12 outputs the acquired TT information to the image generation device 1.

The sonar 13 detects a target by transmitting an ultrasonic wave to the water and receiving the reflected wave of the ultrasonic wave reflected by a target such as a school of fish. The sonar 13 outputs the detected detection information to the image generation device 1.

An input device 14 for the user to input information is connected to the image generation device 1. The input device 14 is a keyboard, a mouse or the like. Note that the input device 14 may be a touch panel for inputting information by touching the display 2, a joystick, or any other device as long as it can input information.

The user gives various instructions about the AR image by the input device 14. For example, the user gives instructions about an operation of changing the attitude of the camera 3, setting of whether or not to display various kinds of information, setting of the viewpoint of the AR image and the like.

Next, the configuration of the image generation device 1 will be explained.

The image generation device 1 includes an AR image generation unit 20, a captured image input unit 21, an image capturing position setting unit 22, an antenna position setting unit 23, a position acquisition unit 24, an attitude acquisition unit 25, a detailed information acquisition unit 26, a storage unit 27, a viewpoint setting unit 28, and a display setting unit 29.

The image generation device 1 is mainly composed of a computer. For example, the computer includes a processing unit and a storage unit. The processing unit is a central processing unit (CPU), a graphics processing unit (GPU) for performing three-dimensional image processing at high speed or the like. The storage unit is various memories, a hard disk drive (HDD) or the like. Note that the computer may be configured in any way. The image generation device 1 operates by executing software (program or the like) for realizing various functions.

The image data output from the camera 3 is input to the captured image input unit 21, for example, at a rate of 30 frames per second. The captured image input unit 21 outputs the input image data to the AR image generation unit 20.

The image capturing position setting unit 22 sets the position (image capturing position) of the camera 3 on the ship 4. For example, the image capturing position is a position in the length direction of the hull, a position in the width direction of the hull and a position in the vertical direction (height). The height of the camera 3 is, for example, a height from the waterline normally assumed on the ship 4 but may be a height from the bottom of the ship or may be based on another reference. In addition, the image capturing position may be set to the image capturing position setting unit 22 by actually measuring the position of the camera 3 by the user and inputting the measurement by the input device 14. The image capturing position setting unit 22 outputs the set image capturing position to the AR image generation unit 20.

The antenna position setting unit 23 sets the position of the GNSS antennas (antenna position) on the ship 4. The antenna position represents a position in the length direction, width direction and vertical direction of the hull with reference to, for example, a reference point 4a of the ship 4 shown in FIG. 2. The reference point 4a is a place to be a control reference. In the present embodiment, the reference point 4a is a position at the center of the hull and at the same height as the normally assumed waterline. However, the reference point 4a may be determined in any way. For example, as is the case of the image capturing position described above, the antenna position may be set by inputting an actual measurement by the user. The antenna position setting unit 23 outputs the set antenna position to the AR image generation unit 20.

The position acquisition unit 24 acquires the current position of the ship 4 in real time based on the detection results of the GNSS receiver 7 and the acceleration sensor 8. The position acquisition unit 24 outputs the acquired current position information about the ship 4 to the AR image generation unit 20.

The attitude acquisition unit 25 acquires the current attitude of the ship 4 in real time based on the detection results of the GNSS compass 5 and the angular velocity sensor 6. The attitude acquisition unit 25 outputs the acquired current attitude information about the ship 4 to the AR image generation unit 20.

The detailed information acquisition unit 26 acquires the detailed information to be added to the image captured by the camera 3 based on the information acquired from the AIS receiver 9, the ECDIS 10, the plotter 11, the radar 12, the sonar 13 and the like. The detailed information is input in real time from these ship devices to the image generation device 1. The detailed information acquisition unit 26 outputs the acquired detailed information to the AR image generation unit 20. The detailed information acquisition unit 26 may add, to each detailed information, identification information (for example, an identification number) for uniquely identifying and managing the detailed information.

The storage unit 27 is configured as a memory which stores various kinds of information. The storage unit 27 may store, for example, a three-dimensional shape of a virtual reality object expressing various kinds of detailed information as a template. The template of the three-dimensional shape stored in the storage unit 27 is, for example, a small ship, a large ship, a buoy, a lighthouse or the like but is not limited to this. The storage unit 27 outputs the stored information to the AR image generation unit 20.

The viewpoint setting unit 28 makes a setting for the viewpoint of the AR image generated by the AR image generation unit 20 by using the input device 14 by the user. The viewpoint setting unit 28 outputs setting information about the viewpoint of the AR image to the AR image generation unit 20.

The display setting unit 29 makes a setting for the display of the detailed information in the AR image generated by the AR image generation unit 20 by using the input device 14 by the user. The display setting unit 29 outputs setting information about the display of the detailed information to the AR image generation unit 20.

The AR image generation unit 20 generates the AR image expressing augmented reality by synthesizing three-dimensional computer graphics with the captured image of the camera 3 input to the captured image input unit 21.

The AR image generation unit 20 includes a detailed information generation unit 31, a three-dimensional scene generation unit 32, a screen information generation unit 33 and a data synthesis unit 34.

The detailed information generation unit 31 generates detailed information to be displayed in the AR image based on the detailed information input from the detailed information acquisition unit 26. The detailed information includes character information which is information represented by characters, figure information which is information represented by figures, and the like. The detailed information generation unit 31 outputs the generated detailed information to the three-dimensional scene generation unit 32 or the screen information generation unit 33. The detailed information may be any information as long as it is needed by the user. For example, the detailed information may be determined based on the object or function of the image generation device 1 or may be information required for the navigation of the ship 4.

For example, detailed information about a target such as a water moving object includes a name (ship name), a position (ship position), a direction (bow direction), a course, a distance, a speed, a turning angular velocity, a destination, a nationality (ship nationality), a type (ship type), a size (length, width, height and the like), a state (navigation state), an identification code, a distance to a closest point of approach (DCPA), a time to a closest point of approach (TCPA), a bow crossing time (BCT), a bow crossing range (BCR), and the like. Here, the DCPA is the distance when the distance to another ship is minimized. The TCPA is the time until the distance to another ship is minimized. The BCT is the time until another ship crosses the bow of the own ship. The BCR is the distance when another ship crosses the bow of the own ship.

In addition, information about the position of a buoy, a virtual buoy or the like may be used as the detailed information based on the AIS information. The virtual buoy is a virtual (insubstantial) buoy which is not actually installed on the sea for a certain reason such as difficulty in installation or the like, but the virtual buoy is displayed as a sign on the screen of a navigation device. As the information included in the electronic chart by the ECDIS 10, a dangerous water, a navigation prohibition area, a lighthouse, a buoy or the like may be used as detailed information. As the information based on the plotter 11, the recoded track of the ship 4, a planned route, a waypoint, an arrival area, a stop-off area or the like may be used as detailed information. As the information based on the radar 12, the position, speed or the like of a detected target may be used as detailed information. As the information based on the sonar 13, the position or the like of a detected school of fish may be used as detailed information.

Figure 3:
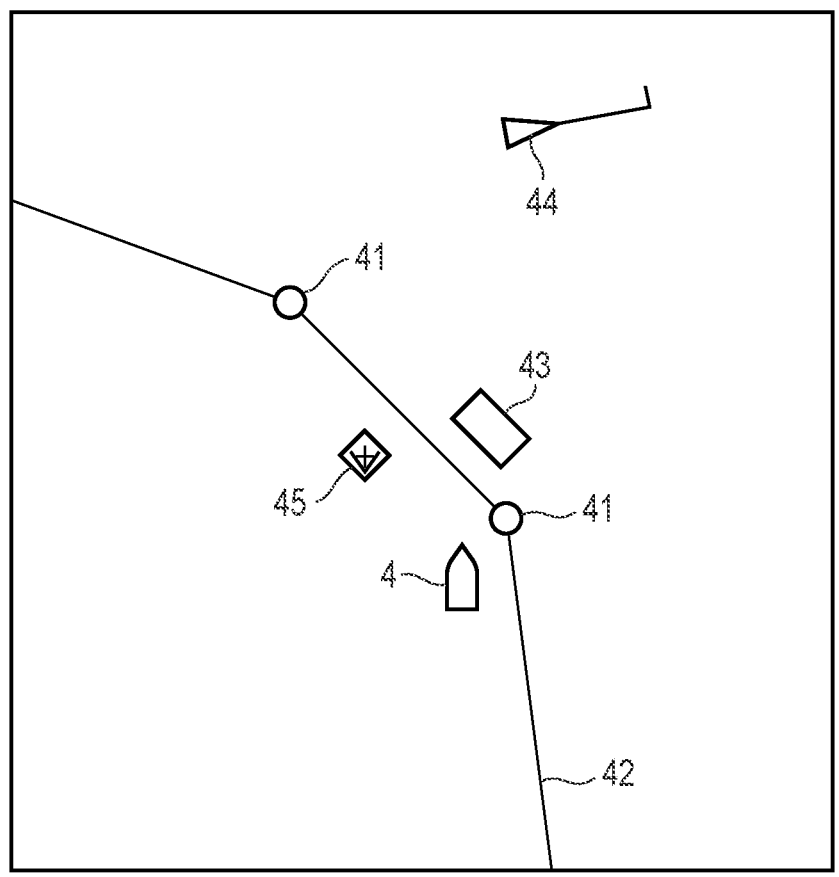
FIG. 3 is a conceptual diagram showing an example of the situation around the ship according to the embodiment.

FIG. 3 is a conceptual diagram showing an example of the situation around the ship 4 according to the present embodiment.

A plurality of waypoints 41 and a polygonal route line 42 indicating a planned route to a destination are shown on the sea surface (on the water surface). A polygonal (rectangular) stop-off area 43 is shown close to the route line 42. The waypoints 41, the route line 42 and the stop-off area 43 are set by operating the plotter 11 by the user.

At a slightly distant point in front of the ship 4, another ship 44 is sailing toward the right side of the ship 4. A virtual buoy 45 is present close to the diagonally left front of the ship 4. This information is detected by the AIS information.

The detailed information includes information indicating a position (latitude and longitude) on the sea surface (water surface) at which the object of the detailed information is arranged. For example, the detailed information about the route line 42 includes the position information about the positions of two changing points (inflection points of the polygonal line). Here, the positions of the two changing points match the positions of the two waypoints 41. The detailed information about the stop-off area 43 includes information about the positions of the points which are the vertexes of the polygonal shape.

Figure 4:
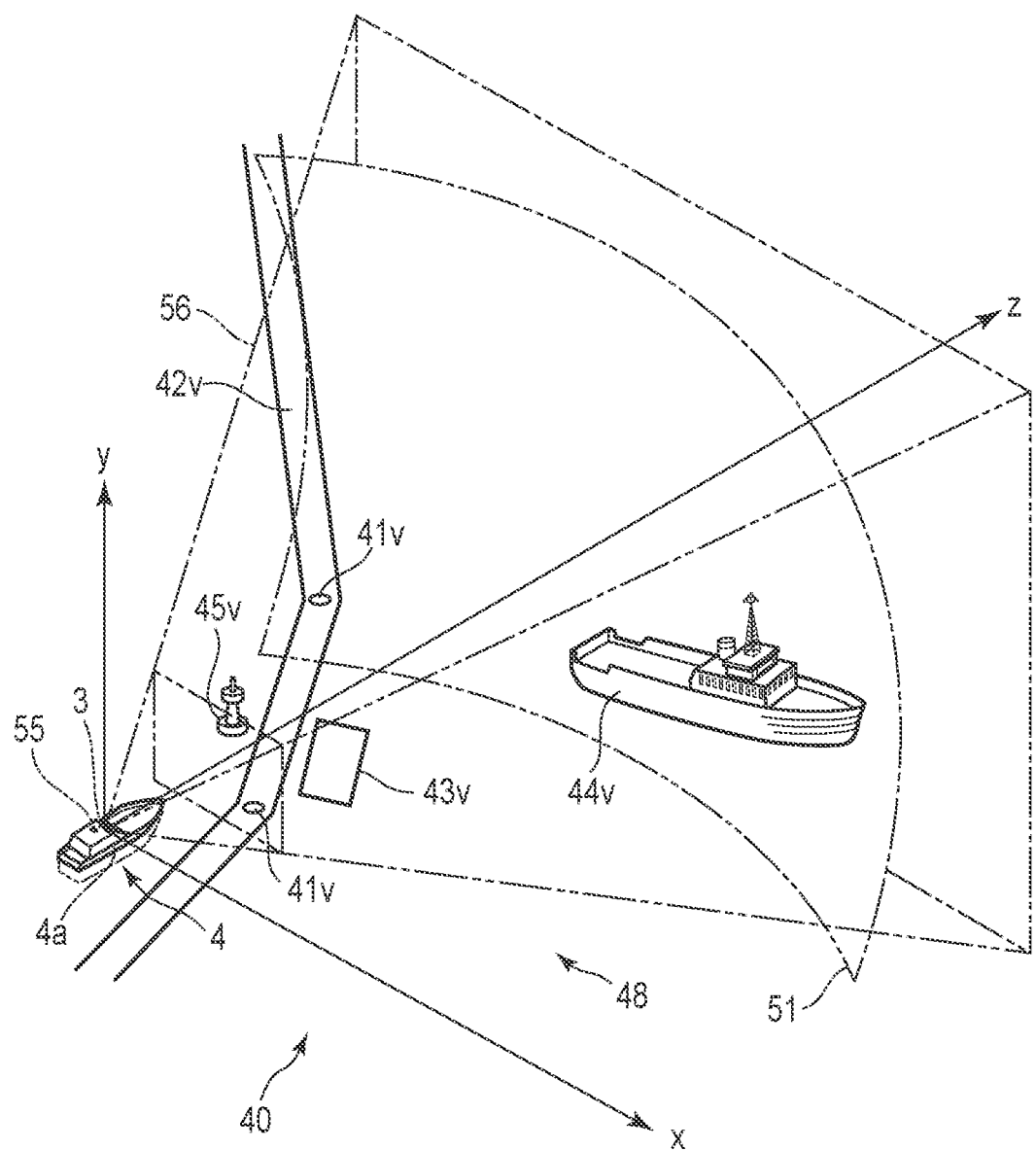
FIG. 4 is a conceptual diagram showing a three-dimensional virtual space according to the embodiment.

FIG. 4 is a conceptual diagram showing a three-dimensional virtual space 40 according to the present embodiment. FIG. 4 shows the three-dimensional virtual space 40 corresponding to the situation around the ship 4 shown in FIG. 3. In addition, the waypoints 41, the route line 42, the stop-off area 43, another ship 44 and the virtual buoy 45 shown in FIG. 3 correspond to virtual reality objects 41v, 42v, 43v, 44v and 45v shown in FIG. 4, respectively.

The three-dimensional scene generation unit 32 generates three-dimensional scene data (three-dimensional display data) 48 of the virtual reality in the three-dimensional virtual space 40 as shown in FIG. 4. The three-dimensional scene generation unit 32 updates the three-dimensional scene data 48 such that the detailed information generated by the detailed information generation unit 31 is displayed in the generated three-dimensional scene based on the setting information set to the display setting unit 29.

If the detailed information is figure information, the three-dimensional scene generation unit 32 generates a virtual reality object corresponding to the detailed information and adds it to the three-dimensional scene data 48. At this time, the template of the virtual reality object stored in the storage unit 27 may be used.

The figure information generating the virtual reality object is, for example, a target not shown on the image captured by the camera 3 such as a virtual buoy, a dangerous water, a navigation prohibition area, the track of the ship 4, a planned route, a waypoint, an arrival area or a stop-off area. In addition, the three-dimensional scene generation unit 32 may generate a virtual reality object indicating a visible target such as another ship as the figure information. In this case, the generated virtual reality object may be displayed superimposed on the actual target shown on the image captured by the camera 3.

The screen information generation unit 33 generates necessary screen information other than the captured image of the camera 3 and the three-dimensional scene data 48. For example, the screen information is information necessary for various settings or operations of the image generation device 1, information for improving operability or visibility, information for displaying a distance or a direction, or the like on the screen of the AR image displayed on the display 2. In addition, in order for the user to grasp situations of the other ships or the like, the screen information generation unit 33 may generate a top view screen (for example, a radar image) representing the surrounding situation centering on the ship 4 as the screen information. Accordingly, the user can grasp the surrounding situation of the ship 4 even outside the range of the AR image (beside or behind the ship 4).

The data synthesis unit 34 draws the three-dimensional scene data 48 generated by the three-dimensional scene generation unit 32 in the captured image of the camera 3 input from the captured image input unit 21, adds the screen information generated by the screen information generation unit 33, and thereby generates the AR image. The data synthesis unit 34 outputs the generated AR image to the display 2. Accordingly, the display 2 displays the AR image.

Next, a method of constructing the three-dimensional virtual space 40 will be explained.

The three-dimensional virtual space 40 in which the virtual reality objects 41v to 45v are arranged is composed of a Cartesian coordinate system using a reference position (for example, the above-described reference point 4a) of the ship 4 as the origin and is set such that the xz plane which is a horizontal plane simulates the sea surface (water surface) as shown in FIG. 4. In the example of FIG. 4, the coordinate axes are defined such that the +z direction always matches the bow direction, the +x direction is the rightward direction, and the +y direction is the upward direction. Each point (coordinates) in the three-dimensional virtual space 40 is set such that it corresponds to an actual position around the ship 4.

The virtual reality objects 41v to 45v are arranged in contact with the xz plane such that the relative positions to the ship 4 are reflected with reference to the bow direction. In order to determine the arrangement positions of the virtual reality objects 41v to 45v, calculation is performed using the position of the GNSS antennas set by the antenna position setting unit 23.

For example, the virtual reality objects 41v to 45v are generated as follows.

The virtual reality object 44v indicating another ship 44 is expressed using a template having the shape of a ship modeled on a large ship. The orientation of the virtual reality object 44v is arranged such that it indicates the orientation of another ship 44 acquired by the AIS information. The virtual reality object 45v indicating the virtual buoy 45 is expressed using a template having a shape modeled on a buoy.

The virtual reality object 41v of the waypoint 41 is expressed by a thin disk-like three-dimensional shape. The virtual reality object 42v of the route line 42 is expressed by a three-dimensional shape that a long thin plate having constant thickness and width is bent into a polygonal line. The virtual reality object 43v of the stop-off area 43 is expressed by such a three-dimensional shape as a plate having a constant thickness and having the contour of the stop-off area 43. These virtual reality objects 41v to 45v may be created each time without using a template.

In FIG. 4, the virtual reality objects 41v to 45v are arranged with reference to the direction using the position of the ship 4 as the origin. Therefore, if the position of the ship 4 changes from the state of FIG. 3 in the east-west direction or the north-south direction or if the bow direction of the ship 4 changes by turning or the like, the three-dimensional scene data 48 is updated to a new three-dimensional scene in which the virtual reality objects 41v to 45v are rearranged. In addition, if the content of the detailed information such as the movement of another ship 44 is changed from the state of FIG. 3, the three-dimensional scene data 48 is updated so as to reflect the latest detailed information.

The data synthesis unit 34 arranges a projection screen 51, which defines a position and a range where the image captured by the camera 3 is projected, in the three-dimensional virtual space 40. The position and orientation of a viewpoint camera 55 are set such that both the projection screen 51 and the virtual reality objects 41v to 45v are included in the viewfield.

The data synthesis unit 34 simulates the position and orientation of the camera 3 installed on the ship 4 in the three-dimensional virtual space 40 and arranges the projection screen 51 in such a way as to directly face the camera 3. In the simulation of the position of the camera 3, the position of the camera 3 with reference to the hull is determined based on the image capturing position set to the image capturing position setting unit 22.

In the simulation of the position and orientation of the camera 3, a change in the orientation by an operation such as panning or tilting of the camera 3 is taken into consideration. In addition, this simulation is performed such that a change in the position and orientation of the camera 3 by a change in the attitude and height of the ship 4 is reflected based on the position information acquired by the position acquisition unit 24 and the attitude information acquired by the attitude acquisition unit 25. The data synthesis unit 34 changes the position and orientation of the projection screen 51 arranged in the three-dimensional virtual space 40 such that they correspond to the change in the position and orientation of the camera 3.

The data synthesis unit 34 generates a two-dimensional image by performing rendering processing to the three-dimensional scene data 48 and the projection screen 51. More specifically, the data synthesis unit 34 arranges the viewpoint camera 55 as a virtual camera in the three-dimensional virtual space 40, and sets a view frustum 56 which defines a range of rendering processing. The view frustum 56 is set such that the viewpoint camera 55 is the apex and the viewline direction from the viewpoint camera 55 is the central axis.

Next, among the polygons constituting the virtual reality objects 41v to 45v and the projection screen 51, the data synthesis unit 34 converts the vertex coordinates of the polygons located inside the view frustum 56 into the coordinates of a two-dimensional virtual screen by perspective projection. This virtual screen corresponds to a display area in which the AR image is displayed on the display 2. The data synthesis unit 34 generates a two-dimensional image by performing processing such as generation and processing of pixels at a predetermined resolution based on the vertex coordinates arranged on the virtual screen.

The generated two-dimensional image includes figures acquired by the drawing of the three-dimensional scene data 48 (that is, figures as the rendering results of the virtual reality objects 41v to 45v). In the process of generating the two-dimensional image, the image captured by the camera 3 is arranged such that it is attached to a position corresponding to the projection screen 51. Accordingly, the image synthesis by the data synthesis unit 34 is realized. The projection screen 51 is formed in a curved shape along the spherical shell centered on the camera 3, and prevents distortion of the captured image by perspective projection.

The viewpoint camera 55 defines the viewpoint of the AR image. Normally, the position and orientation of the viewpoint camera 55 is determined by the setting of the viewpoint setting unit 28. By making a special setting to the viewpoint setting unit 28, the data synthesis unit 34 is set to a mode in which the position and orientation of the viewpoint camera 55 automatically changes so to as to always match the position and orientation of the camera 3 as the mode during AR image generation (viewpoint following mode). In the viewpoint following mode, the entire viewfield of the viewpoint camera 55 is always covered with the projection screen 51 (that is, the image captured by the camera 3). Accordingly, an AR image with a sense of reality can be realized.

The data synthesis unit 34 may include a mode in which the position and orientation of the viewpoint camera 55 follow the viewpoint set to the viewpoint setting unit 28 by the operation of the input device 14 regardless of the position and orientation of the camera 3 (independent viewpoint mode). In the independent viewpoint mode, the user can check detailed information at a position outside the viewfield of the captured image of the camera 3 by freely moving the viewpoint.

Figure 5:
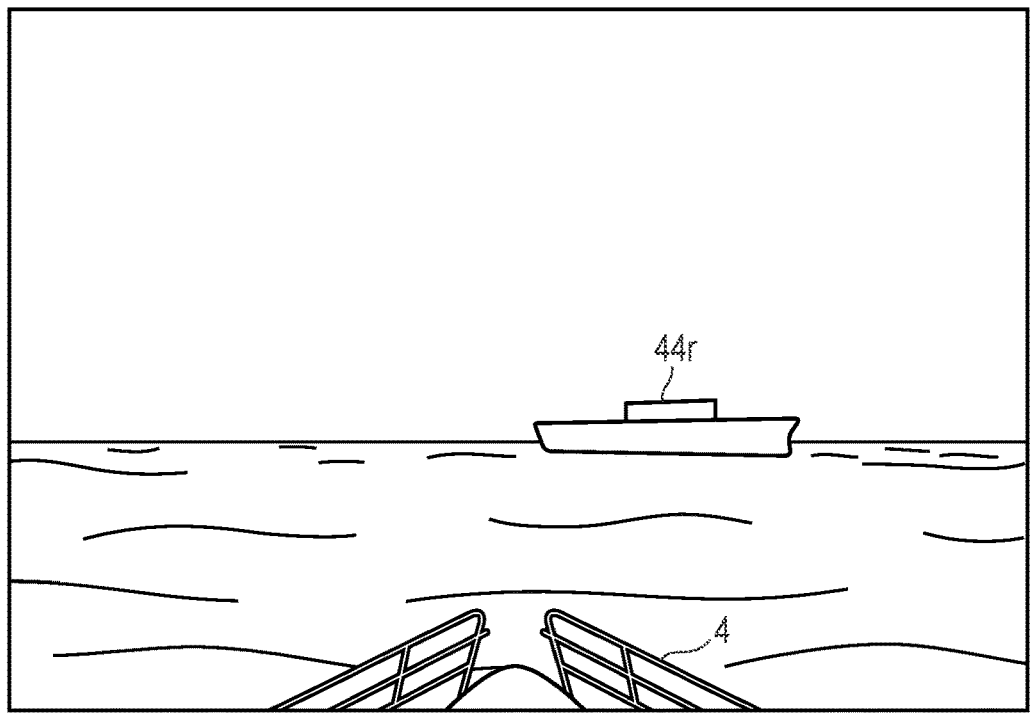
FIG. 5 is an image diagram showing an example of an image captured by a camera according to the embodiment.
Figure 6:
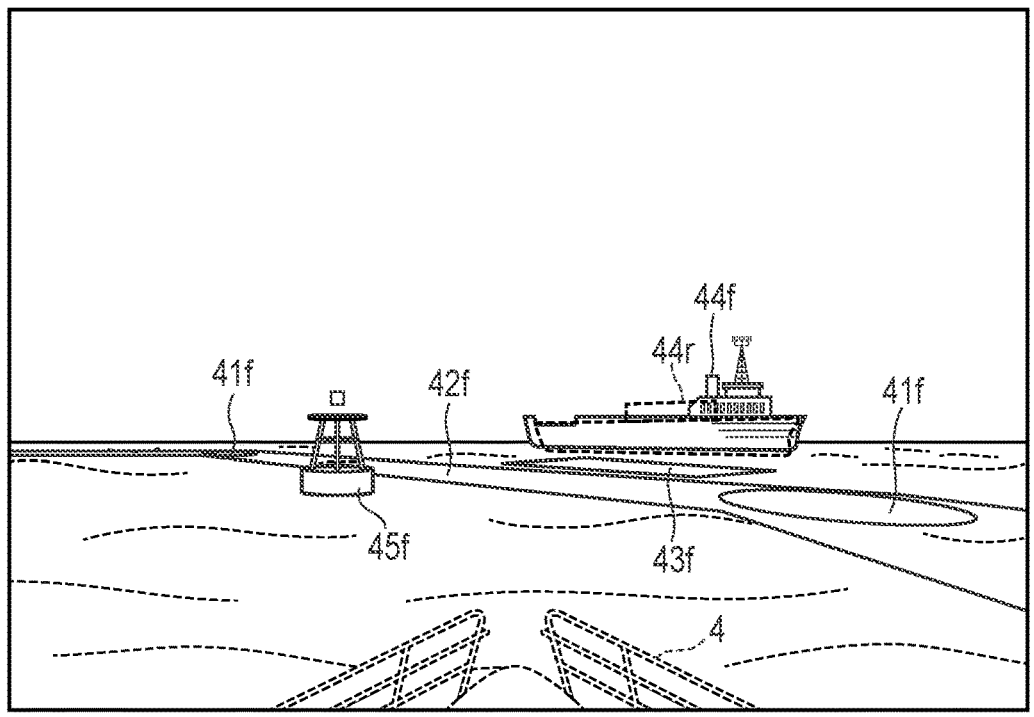
FIG. 6 is an image diagram showing an AR image output from a data synthesis unit according to the embodiment.

The relationship between the image captured by the camera 3 and the AR image will be explained with reference to FIGS. 5 and 6. FIG. 5 is an image diagram showing an example of the image captured by the camera 3. FIG. 6 is an image diagram showing the AR image output from the data synthesis unit 34.

FIG. 5 shows the image captured by the camera 3 of the ship 4 in the situation shown in FIG. 3. The captured image shows another ship 44r floating on the sea surface. In addition, a bow part of the ship 4 is shown at the lower center of the captured image.

Since the virtual buoy 45 is virtual, it does not appear in the captured image. Since the waypoints 41, the route line 42 and the stop-off area 43 are created by the plotter 11, they do not appear in the captured image, either.

The AR image shown in FIG. 6 is the image in which the two-dimensional image acquired by rendering the three-dimensional scene data 48 of FIG. 4 is synthesized with the captured image shown in FIG. 5. In the AR image of FIG. 6, FIGS. 41*f*, 42*f*, 43*f*, 44*f* and 45*f* expressing detailed information are arranged overlapping the captured image shown in FIG. 5. Here, in FIG. 6, a captured image part of the camera 3 is shown by a broken line so as to be differentiated from the other part (the same applies to FIGS. 8 to 10). The FIGS. 41*f* to 45*f* correspond to the virtual reality objects 41*v* to 45*v*, respectively. The FIG. 44*f* representing another ship is arranged substantially overlapping the position of another ship 44*r* in the captured image.

The FIGS. 41*f* to 45*f* are generated as a result of drawing the three-dimensional shapes of the virtual reality objects 41*v* to 45*v* constituting the three-dimensional scene data 48 shown in FIG. 4 from the viewpoint of the same position and orientation as the camera 3. Therefore, even if the FIGS. 41*f* to 45*f* are superimposed on the realistic image captured by the camera 3, a sense of discomfort in appearance hardly occurs.

As shown in FIG. 6, the FIGS. 41*f* to 45*f* expressing detailed information in a virtual reality are arranged in the AR image such that they are placed on the water surface of the captured image. In other words, the FIGS. 41*f* to 45*f* expressing detailed information in a virtual reality are arranged along the water surface of the captured image.

This arrangement is realized as follows. The virtual reality objects 41*v* to 45*v* shown in FIG. 4 are arranged such that they are in contact with the xz plane located below with respect to the camera 3 by a distance calculated based on the height set by the image capturing position setting unit 22. In addition, the position of the projection screen 51 is correctly arranged in consideration of the position and orientation of the camera 3. Accordingly, the arrangement of the FIGS. 41*f* to 45*f* on the water surface is realized.

For targets indicating information about the navigation of the ship 4 (own navigation information), information about the target (name, position or the like) may be each displayed at the end of a line drawn above from the target, and for the other targets, information about the target may be each displayed at the end of a line drawn below from the target. By displaying in this way, the own navigation information and the other information can be easily differentiated from each other. For example, the own navigation information includes a waypoint, a route line, a stop-off area and the like.

Figure 7:
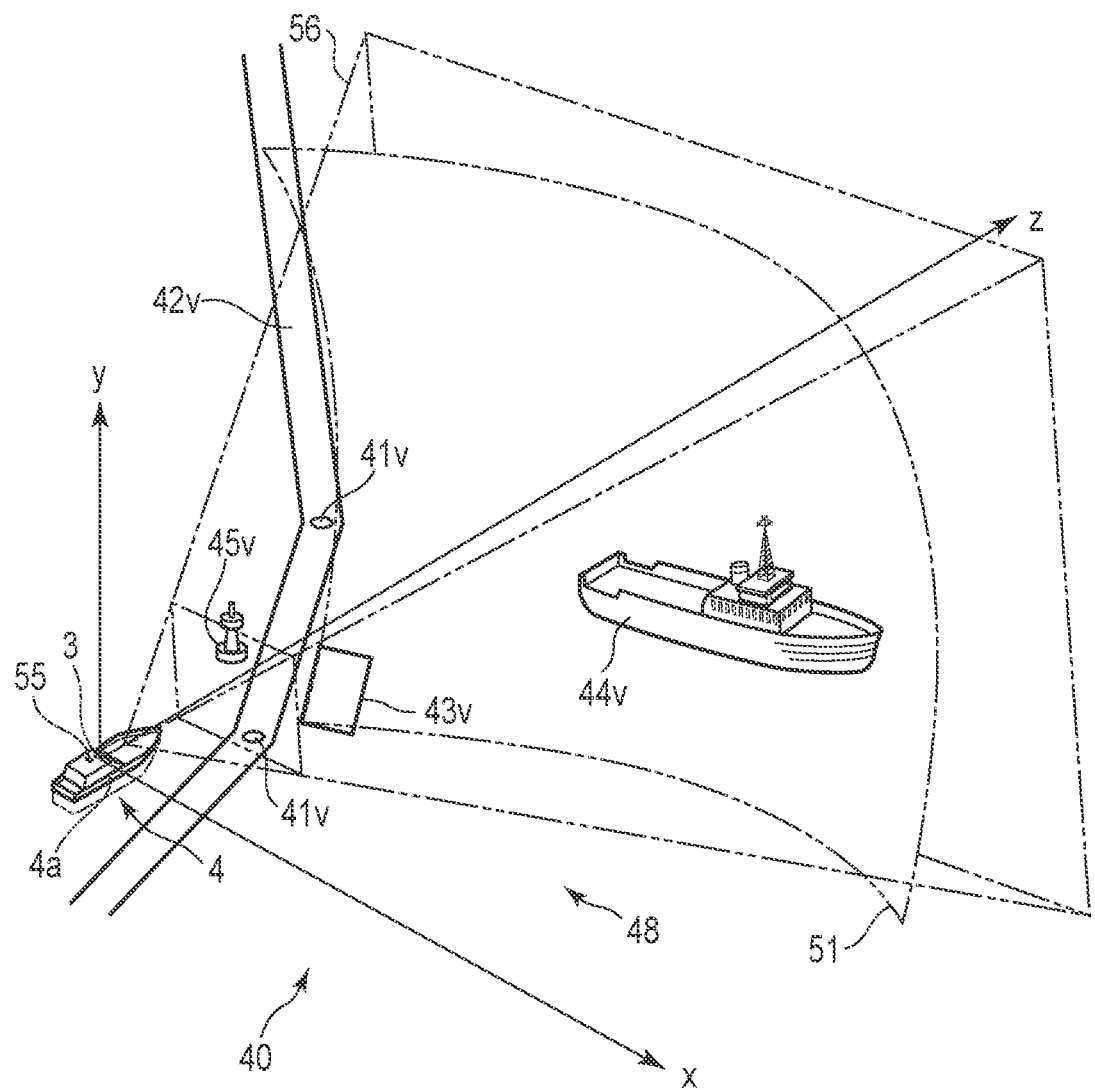
FIG. 7 is a conceptual diagram showing a case where the ship sways in a pitch direction and a roll direction from a state shown in FIG. 4.
Figure 8:
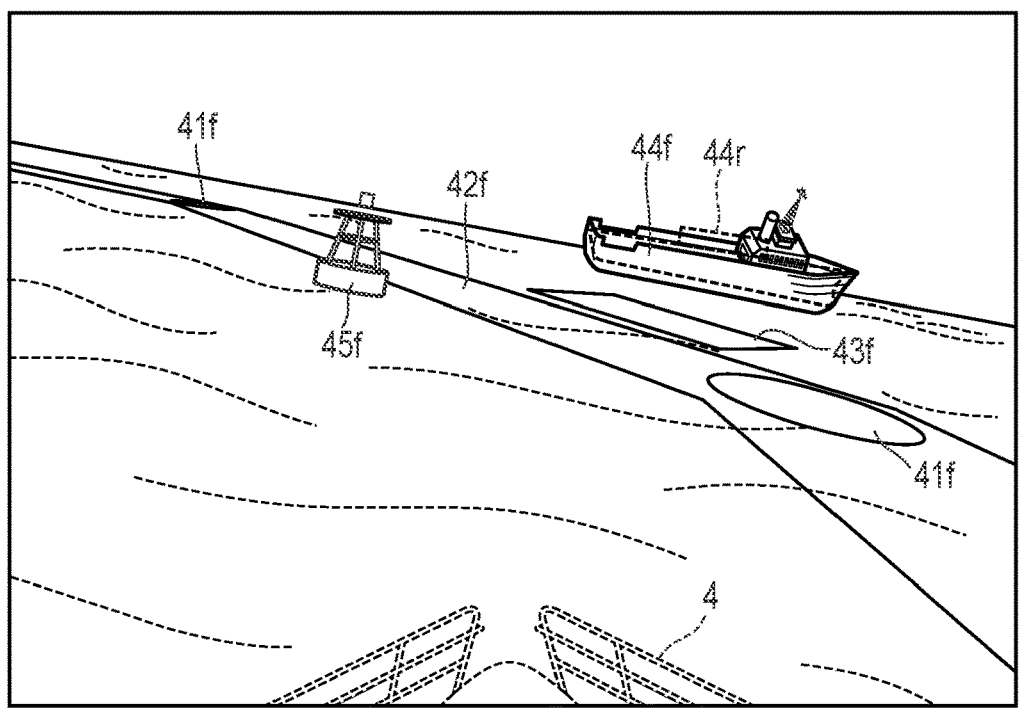
FIG. 8 is an image diagram showing the AR image in a state of FIG. 7.

Next, a change in the AR image by the swaying of the ship 4 will be explained. FIG. 7 is a conceptual diagram showing a case where the ship 4 sways in the pitch direction and the roll direction from the state of FIG. 4. FIG. 8 is an image diagram showing the AR image in the state of FIG. 7.

Since the camera 3 is mounted on the ship 4, the position and orientation change as the attitude of the ship 4 is tilted by a wave or the like or the ship 4 rides a wave. If swaying (pitching, rolling and heaving) occurs in the ship 4, the data synthesis unit 34 changes the position and orientation of the camera 3 in the three-dimensional virtual space 40 so as to simulate a change in the attitude of the ship 4 acquired by the attitude acquisition unit 25 and a change in the vertical direction of the position of the ship 4 acquired by the position acquisition unit 24. Along with this change, the position of the projection screen 51 is changed.

In the example of FIG. 7, the ship 4 tilts forward and leftward, and the position and orientation of the camera 3 change so as to reflect this tilt. In conjunction with this, the projection screen 51 moves so as to directly face the camera 3 whose position and orientation are changed.

In this example, by the viewpoint following mode, the position and orientation of the viewpoint camera 55 are changed so as to follow the camera 3 whose position and orientation are changed. Even if the position and orientation of the camera 3 are changed by the swaying of the ship 4, the position and orientation of the projection screen 51 are changed in conjunction with this, and the position and orientation of the viewpoint camera 55 which renders the three-dimensional scene are changed. Accordingly, the AR image generation unit 20 continuously generates an AR image without a sense of discomfort as shown in FIG. 8.

In the viewpoint following mode, every time the pitch angle or roll angle is changed by greater than or equal to a predetermined value by the swaying of the ship 4, the drawing of the three-dimensional scene data 48 by the data synthesis unit 34 is updated, and the FIGS. 41*f* to 45*f* based on the latest viewpoint are generated. By updating the drawing, the display of the FIGS. 41*f* to 45*f* changes so as to remain placed on the sea surface with respect to the image captured by the camera 3 in which the inclination of the sea surface changes by the swaying of the ship 4.

Accordingly, the figures expressed in a virtual reality appear to be floating on the sea surface, and the AR image becomes a natural and highly realistic image. In addition, since the user comprehensively see the FIGS. 41*f* to 45*f* representing the virtual reality objects 41*v* to 45*v* by looking at the sea surface of the AR image displayed on the display 2, the user can acquire necessary information without omission.

Figure 9:
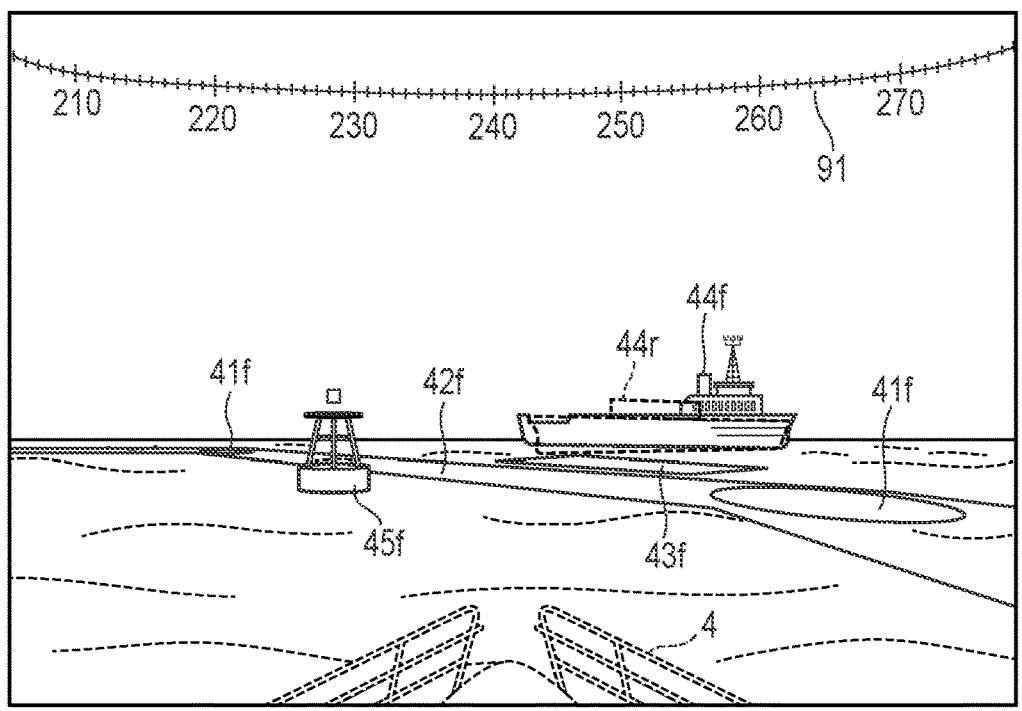
FIG. 9 is an image diagram in which scale information indicating a direction is displayed in the AR image according to the embodiment.
Figure 10:
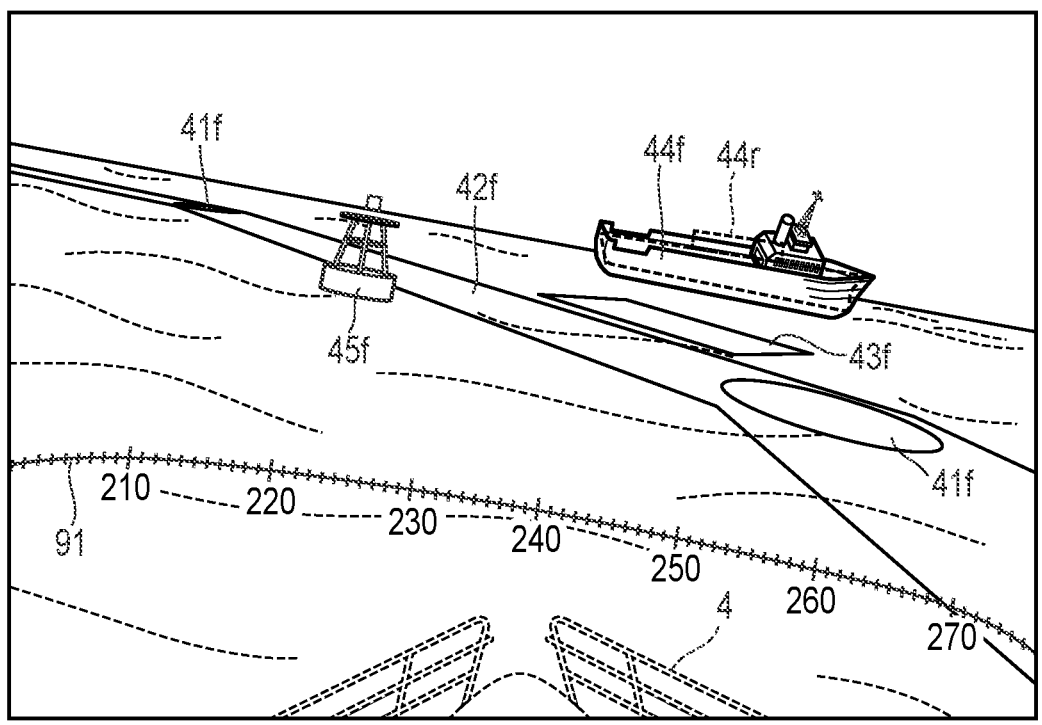
FIG. 10 is an image diagram in which the scale information indicating the direction is displayed in the AR image according to the tilt of a hull according to the embodiment.

With reference to FIGS. 9 and 10, a configuration for displaying scale information 91 indicating a direction in the AR image generated by the AR image generation unit 20 will be explained. Note that the scale information 91 may be selectively displayed or the scale information 91 may not be displayed.

In order to display the scale information 91, the detailed information generation unit 31 collects necessary information from ship devices and the like. The detailed information generation unit 31 outputs the collected information to the screen information generation unit 33.

The screen information generation unit 33 generates an image or the like to be displayed as the scale information 91 in the AR image based on the information received from the detailed information generation unit 31. The screen information generation unit 33 outputs the generated scale information 91 to the data synthesis unit 34.

While synthesizing the three-dimensional scene data 48 generated by the three-dimensional scene generation unit 32 with the image captured by the camera 3, the data synthesis unit 34 also synthesizes the image to be the scale information 91 generated by the screen information generation unit 33.

The scale information 91 is displayed, for example, at a predetermined position such as an upper part, a lower part or the like of the AR image as shown in FIG. 9. The position of the scale information 91 may be automatically moved or changed so as not to overlap the detailed information such as the FIGS. 41*f* to 45*f* as shown in FIG. 10. In addition, the scale information 91 may be displayed tilted so as to always remain parallel to the horizon according to the tilt of the hull of the ship 4 as shown in FIG. 10. By displaying in this way, the scale information 91 can always indicate an accurate direction.

Figure 11:
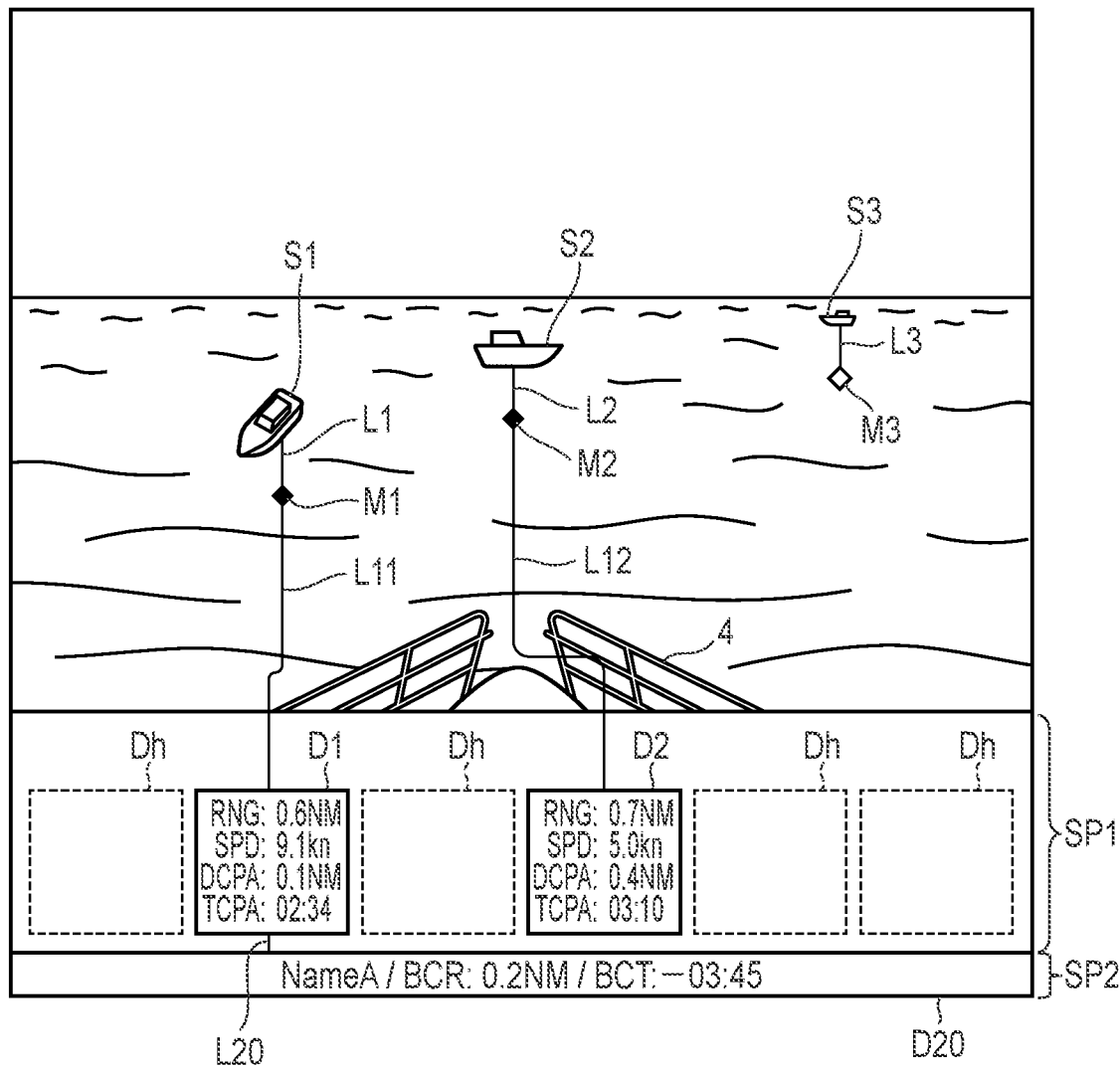
FIG. 11 is an image diagram in which detailed information is displayed in the AR image according to the embodiment.

A method of displaying the detailed information about the target in the AR image will be explained with reference to FIGS. 11 and 12. FIG. 11 is an image diagram showing an AR image in which pieces of detailed information D1, D2 and D20 are displayed. FIG. 12 is a flow diagram showing an outline of a procedure for displaying the pieces of detailed information D1, D2 and D20 in the AR image.

Here, the explanation is based on the assumption that there are three water moving objects S1, S2 and S3 in front of the ship 4 in the AR image. In addition, although the explanation mainly uses the water moving objects S1 to S3 as the target, detailed information may be displayed similarly for any target (including an intangible object) other than the water moving objects S1 to S3.

The detailed information held by the image generation device 1 is divided into three kinds, that is, main information (corresponding to first detailed information), sub-information (corresponding to second detailed information) and non-display information. The main information is displayed in a first space SP1. The sub-information is displayed in a second space SP2. The non-display information is not displayed in the AR image. The pieces of detailed information (items) corresponding respectively to the main information, the sub-information and the non-display information are arbitrarily set by the input device 14 by the user. For example, a list of items is displayed in the AR image, and items corresponding respectively to the main information, the sub-information and the non-display information are selected in a drop-down manner.

When the target water moving objects S1 to S3 are detected by the ship device such as the AIS receiver 9 or the radar 12 (step ST101), markers M1, M2 and M3 for making a selection and corresponding to the water moving objects S1 to S3 in the AR image are displayed (step ST102). The markers M1 to M3 are connected to correspondence lines L1, L2 and L3 indicating a correspondence relationship and extending downward from the corresponding water moving objects S1 to S3, respectively.

The shape of the markers M1 to M3 may vary depending on the type of the ship device which detects. For example, the shape of the marker is a rhomboid shape when the target is detected by the AIS receiver 9, and the shape of the marker is a circular shape when the target is detected by the radar 12. In addition, the target may be detected by the ship device such as the ECDIS 10 or the sonar 13. Furthermore, when one target is detected by more than one ship device, markers M1 to M3 detected from one target and corresponding to the respective ship devices may be displayed, only arbitrarily selected markers may be displayed, or markers combined into one may be displayed.

When the user displays more detailed detailed information about the water moving objects S1 to S3, the user selects (for example, clicks) the markers M1 to M3 connected to the water moving objects S1 to S3 of the detailed information to be displayed (step ST103). When the markers M1 to M3 are selected, the display may be changed such that the color is inverted or the like.

When the markers M1 to M3 are selected, the pieces of main information about the targets corresponding to the selected markers M1 to M3 are displayed at a predetermined place of the AR image (step ST104). FIG. 11 shows a state where the markers M1 and M2 of two water moving objects S1 and S2 are selected, and the pieces of main information D1 and D2 of the water moving objects S1 and S2 are displayed in the first space SP1 in the lower part of the AR image as the predetermined place. For example, the pieces of main information D1 and D2 each include the distance to the own ship (the ship 4), the speed, the DCPA and the TCPA. In order to display the correspondence relationships of the water moving objects S1 and S2 to the pieces of main information D1 and D2 in an easy-to-understand manner, the markers M1 and M2 and the pieces of main information D1 and D2 are connected by correspondence lines L11 and L12 that the correspondence lines L1 and L2 are extended, respectively.

If the sub-information is displayed in addition to the main information D1 for the water moving object S1, the user selects a display field in which the main information D1 is displayed (step ST105). When the display field of the main information D1 is selected, as shown in FIG. 11, sub-information D20 corresponding to the selected main information D1 is displayed in the second space SP2 below the first space SP1 (step ST106). The sub-information D20 is connected by a correspondence line L20 indicating that it corresponds to the main information D1 in the first space SP1.

The user can select whether to display or hide the sub-information D20. When the sub-information is hidden, the second space SP2 disappears, and the first space SP1 displaying the pieces of main information D1 and D2 moves to the lower side of the AR image. When the sub-information D20 is not required, the captured image part of the camera 3 in the AR image is expanded by eliminating the second space SP2. Note that the second space SP2 may be always reserved or may appear when either of the display fields of the pieces of the main information D1 and D2 is selected.

Although a case where a piece of sub-information D20 is displayed is explained here, two or more pieces of sub-information may be displayed or the sub-information may be eliminated.

Figure 13:
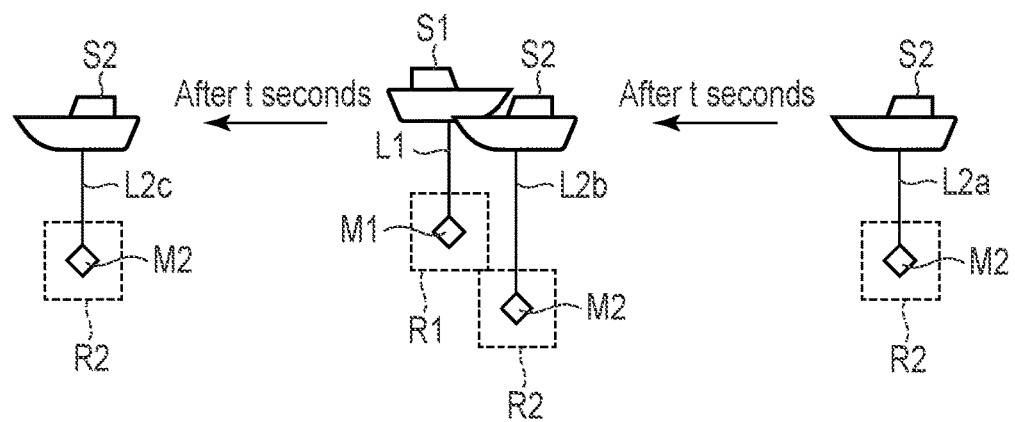
FIG. 13 is a conceptual diagram showing a basic method of displaying a marker in the AR image according to the embodiment.

A basic method of displaying the makers M1 and M2 in the AR image will be explained with reference to FIG. 13.

A case where the second (another) water moving object S2 passes by the side of the first water moving object S1 in the state of being oriented sideways and substantially stopped from the right to the left of the screen in front of the ship 4 will be explained here.

One size larger quadrangles shown by broken lines surrounding the outsides of the markers M1 and M2 represent touch determination regions R1 and R2, respectively. The touch determination regions R1 and R2 are regions for determining whether or not the markers M1 and M2 are touched, respectively.

For example, when the input device 14 is a touch panel, if a finger or the like touches the insides of the touch determination regions R1 and R2, it is determined that the markers M1 and M2 are touched (that is, selected). When the input device 14 is a mouse, if a predetermined operation such as clicking is performed in a state where a cursor is in the touch determination regions R1 and R2, it is determined that the markers M1 and M2 are touched. By making the touch determination regions R1 and R2 one size larger than the markers M1 and M2, even if touching is performed slightly away from the markers M1 and M2, it is still determined that the markers M1 and M2 are touched. Accordingly, the operability of the user is improved.

The second water moving object S2 at an initial position is sufficiently away from the first water moving object S1. At this time, the correspondence lines L1 and L2a connected to two water moving objects S1 and S2 have an initially set and smallest length. It is assumed that the length of the correspondence line L1 of the first water moving object S1 thereafter remains unchanged. The initially set length may not be the smallest.

The second water moving object S2 after t seconds from the initial position is close to the first water moving object S1. In this state, if the correspondence lines L1 and L2b of two water moving objects S1 and S2 have the initially set length, the touch determination regions R1 and R2 of two water moving objects S1 and S2 partly overlap. Therefore, the correspondence line L2b of the second water moving object S2 is displayed such that it gradually extends downward until the touch determination region R2 does not overlap the touch determination region R1 of the first water moving object S1. By gradually changing the length of the correspondence line L2b as described above, the marker M2 is moved visually continuously. This makes it easier for the user to visually follow the moving marker M2. While the length of the correspondence line L2b of the second water moving object S2 is changing, two touch determination regions R1 and R2 may temporarily overlap.

The second water moving object S2 after another t seconds from the state of being close to the first water moving object S1 is sufficiently away from the first water moving object S1 again, and two touch determination regions R1 and R2 do not overlap regardless of the length of the correspondence line L2c. Therefore, the correspondence line L2c of the second water moving object S2 shrinks until it reaches the initially set state of having the smallest length.

As described above, the lengths of the correspondence lines L1 and L2a to L2c of the respective water moving objects S1 and S2 change increasing and decreasing so that two touch determination regions R1 and R2 do not overlap.

Although a case where the lengths of the correspondence lines L2a to L2c of the moving second water moving object S2 change is described here, the length of the correspondence line L1 of the stopped first water moving object S1 may change.

Figure 14:
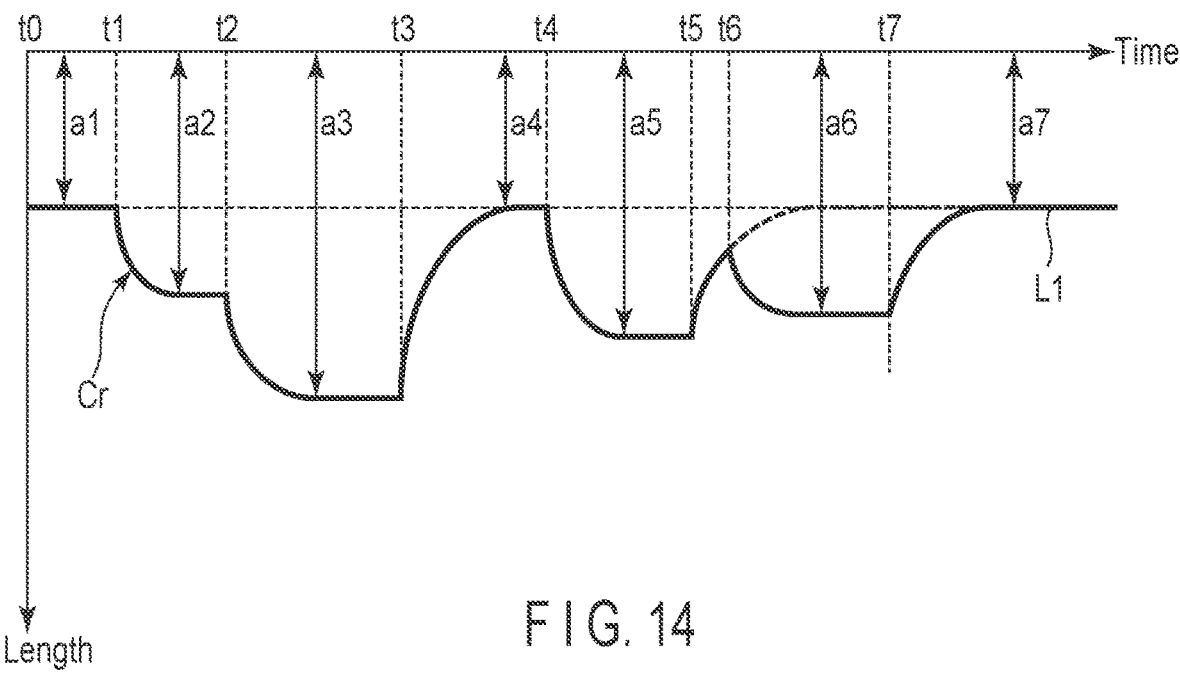
FIG. 14 is a graph showing an example of a change in the length of a correspondence line connected to the marker of a first water moving object according to the embodiment.

An example of the change of the length of the correspondence line L1 connecting the first water moving object S1 and the marker M1 will be explained with reference to FIG. 14. In FIG. 14, the horizontal axis represents the elapsed time and the vertical axis represents the length of the correspondence line L1 changing in the vertical direction in the AR image.

At a time t0, a length a1 of the correspondence line L1 of the first water moving object S1 is an initially set and smallest length.

At a time t1, when the touch determination region R1 of the first water moving object S1 comes into contact with the touch determination region of another water moving object (second water moving object), the screen information generation unit 33 calculates a length a2 of the correspondence line L1 with which two touch determination regions do not overlap. Two touch determination regions may be spaced apart as much as needed.

The screen information generation unit 33 does not necessarily start calculation after two touch determination regions come into contact with each other, and may start calculation before two touch determination regions come into contact with each other. In addition, whether or not two touch determination regions come into contact with each other is not necessarily determined when the positions of two touch determination regions are directly detected but may be determined based on the position of the water moving objects, the markers, the correspondence lines or the like.

The screen information generation unit 33 changes (draws) the correspondence line L1 so that the length a1 of the correspondence line L1 gradually becomes the calculated length a2. Accordingly, the correspondence line L1 of the first water moving object S1 reaches the intended length a2.

For example, the screen information generation unit 33 changes the length of the correspondence line L1 as shown by a curve Cr shown in FIG. 14. The curve Cr indicates that the rate of change gradually decreases as the length of the correspondence line L1 approaches the intended length a2. This makes it easier for the user to visually follow the marker M1. A method of drawing such that the length a1 of the correspondence line L1 gradually changes may employ an existing method used in graphics, animation or the like.

At a time t2, while the correspondence line L1 of the first water moving object S1 remains extended to the length a2, the touch determination region R1 of the first water moving object S1 comes into contact with the touch determination region of another water moving object (third water moving object). The screen information generation unit 33 calculates a length a3 with which the touch determination region R1 of the first water moving object S1 does not overlap the touch determination region of the newly contacting third water moving object. As is the case of the time t1, the screen information generation unit 33 changes the correspondence line L1 such that it gradually extends from the current length a2 to the calculated length a3. Accordingly, the correspondence line L1 of the first water moving object S1 reaches the intended length a3.

At a time t3, when the second water moving object and the third water moving object disappear from close to the first water moving object S1, the screen information generation unit 33 changes the length of the correspondence line L1 such that the length a3 of the correspondence line L1 gradually decreases (returns) to the initially set length a4. When the length of the correspondence line L1 decreases, as is the case of increasing, by changing the correspondence line L1 in the curve Cr, the length of the correspondence line L1 gradually changes. Accordingly, the correspondence line L1 of the first water moving object S1 returns to the initially set length a4.

At a time t4, when the touch determination region R1 of the first water moving object S1 comes into contact with the touch determination region of another water moving object (fourth water moving object), as is the case of the times t1 and t2, the screen information generation unit 33 calculates the intended length a5 of the correspondence line L1.

Accordingly, the correspondence line L1 of the first water moving object S1 reaches the intended length a5.

At a time t5, when the fourth water moving object disappears from close to the first water moving object S1, as is the case of the time t3, the screen information generation unit 33 starts returning the correspondence line L1 to the initially set length.

At a time t6, before the correspondence line L1 reaches the initially set length, the touch determination region R1 of the first water moving object S1 comes into contact with the touch determination region of another water moving object (fifth water moving object). The screen information generation unit 33 calculates an intended length a6 of the correspondence line L1, and changes the correspondence line L1 such that it gradually extends from the state of decreasing to the initially set length to the intended length a6. Accordingly, the correspondence line L1 of the first water moving object S1 reaches the intended length a6.

At a time t7, when the fifth water moving object disappears from close to the first water moving object S1, as is the case of the times t3 and t5, the screen information generation unit 33 starts returning the correspondence line L1 to the initially set length. Accordingly, the correspondence line L1 of the first water moving object S1 reaches the initially set length a7.

By changing the length of the correspondence line L1 such that the touch determination region R1 of the first water moving object S1 does not overlap the touch determination region of another water moving object as described above, the user can easily select the markers of the respective water moving objects.

Here, for the sake of convenience of explanation, attention is paid to the first water moving object S1 and the correspondence line L1 is changed. In reality, however, in the respective water moving objects, as is the case of the first water moving object S1, the lengths of the correspondence lines connected to the markers are changed such that the touch determination regions do not overlap.

If the touch determination regions of a plurality of water moving objects overlap, the correspondence line whose length is to be changed is determined in order of priority determined based on the respective water moving objects, the respective markers or the like. The order of priority may be preassigned to the respective water moving objects or the respective markers. The order of priority may be the display order of the markers (in the order from new to old or from old to new) or may be determined based on the positions (top/bottom or left/right of the screen) of the respective water moving objects or the respective markers. For example, as the marker is located at a lower position on the screen, the length of the correspondence line may be changed more preferentially. The length to be increased when the correspondence line of the marker at a lower position is extended is less than when the correspondence line of the marker at an upper position is extended. In addition, the correspondence line to be changed may be determined based on the current lengths of the respective correspondence lines or the like.

Figure 15:
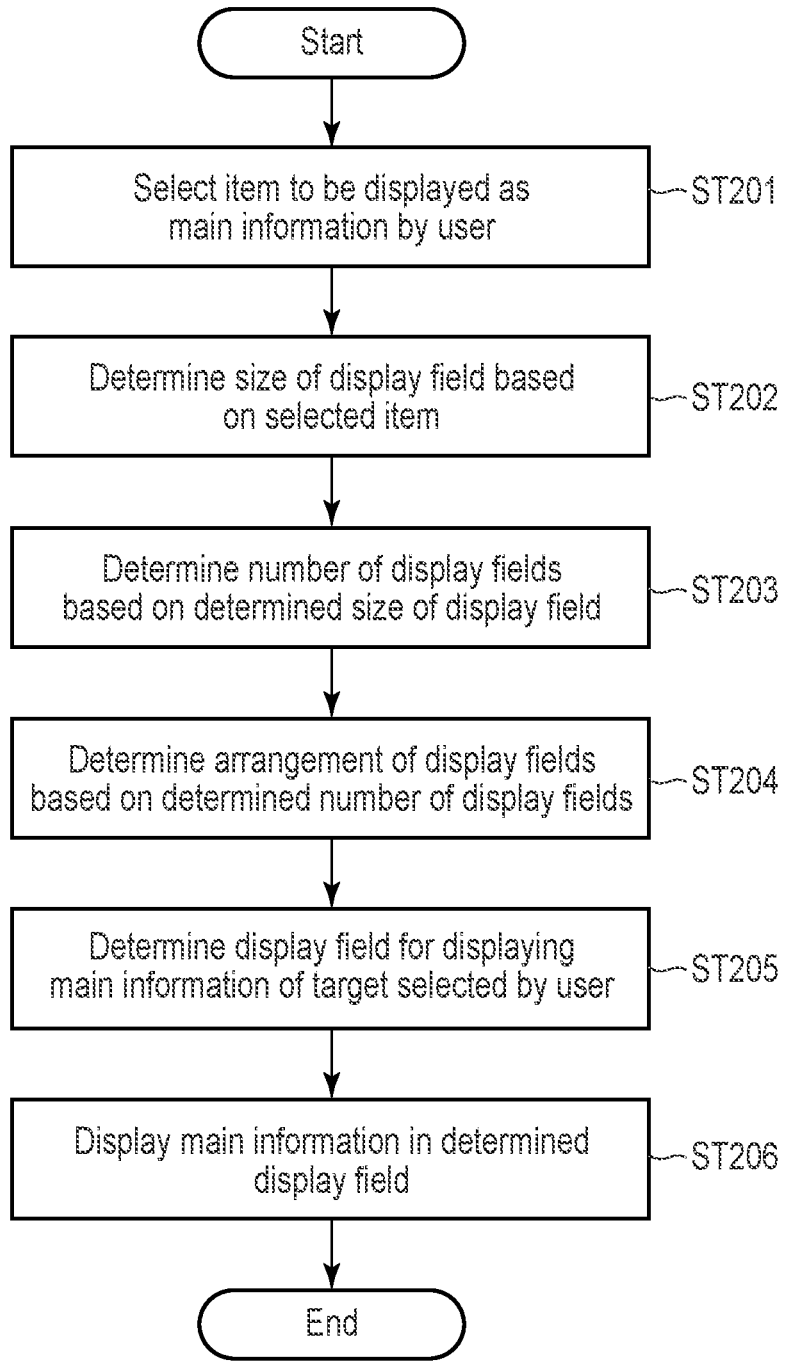
FIG. 15 is a flow diagram showing a procedure for displaying main information in the AR image according to the embodiment.

A method of displaying the pieces of main information D1 and D2 will be explained with reference to FIGS. 11 and 15. FIG. 15 is a flow diagram showing a procedure of displaying the pieces of main information D1 and D2 on the AR image.

In the first space SP1 of FIG. 11, display fields Dh for displaying main information which are indicated by dashed lines and in which nothing is actually displayed are reserved in addition to parts in which the pieces of main information D1 and D2 are displayed. The display fields Dh are determined as follows.

The user selects items to be displayed as the main information D1 and D2 by the input device 14 (step ST201). FIG. 11 shows an example of the AR image in which the items such as the distance to the own ship, the speed, the DCPA and the TCPA are displayed as the main information D1 and D2.

The screen information generation unit 33 determines the size of the display fields Dh based on the items selected as the main information D1 and D2 (step ST202). The height of the display fields is determined based on the number of selected items. The width of the display fields is determined based on the largest number of characters of the numbers of characters reserved respectively for the selected items. The number of characters reserved for an item expressed only by a number and a unit such as a position, a distance, a speed or a time is basically small. The number of characters reserved for an item which can displays a proper noun (such as a ship name or a place name) or a sentence is basically large.

The screen information generation unit 33 determines the number of display fields Dh based on the determined size of the display fields Dh (step ST203). For example, if the width of the first space SP1 is divided by the width of the display fields Dh, the number of display fields Dh which can be arranged side by side can be found. The correspondence relationship between the size and number of the display fields Dh may be stored in advice as table data. FIG. 11 shows an example where the display fields Dh are displayed in one row at one level. However, when one row is assumed to be one level, the display fields Dh may be displayed at two or more levels stacked one above the other. In this case, as is the case of the number of display fields Dh arranged side by side, the number of levels at which the display fields Dh are stacked one above the other may be determined based on the height of the first space SP1 and the height of the display fields Dh.

Figure 16:
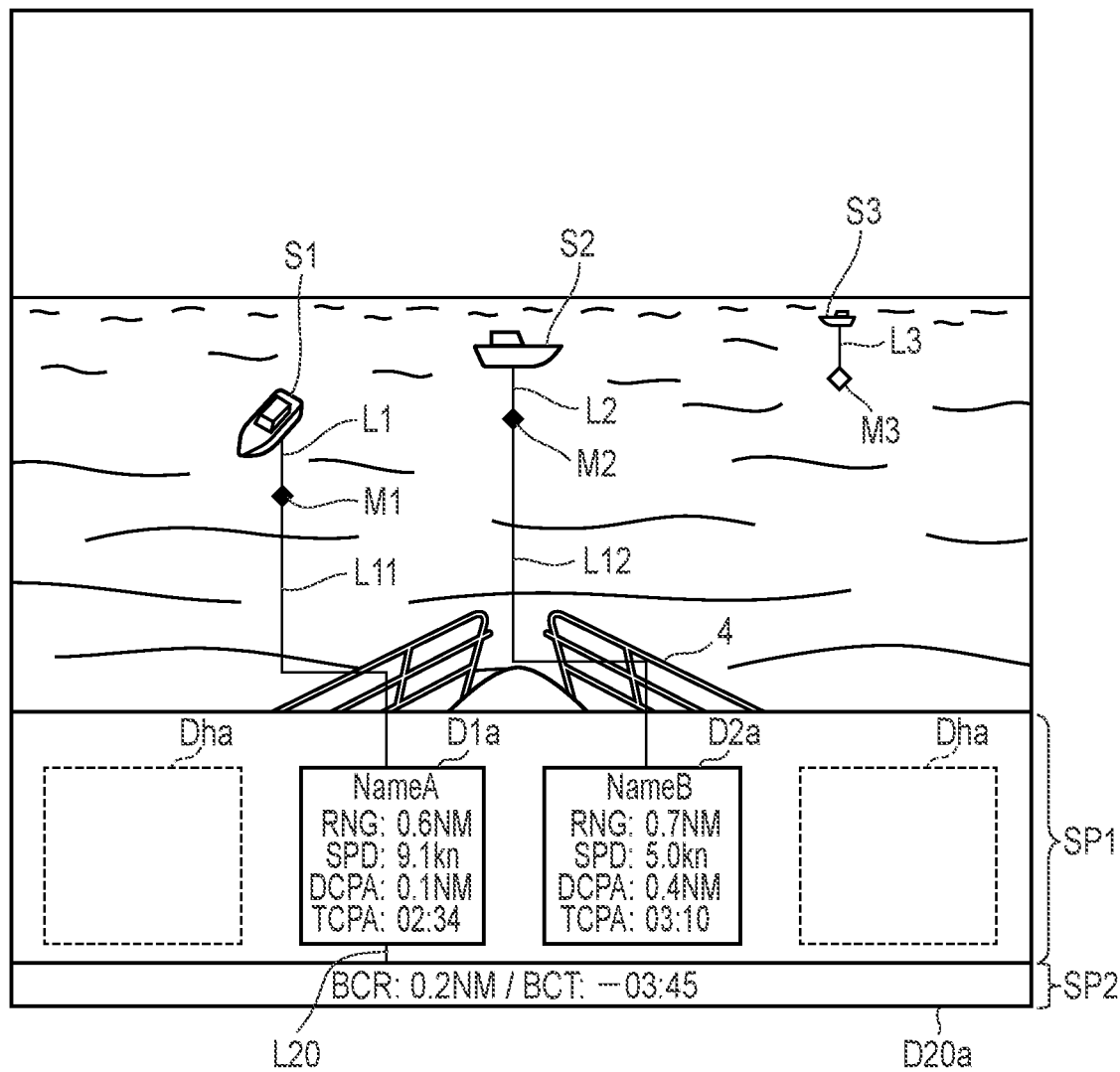
FIG. 16 is an image diagram in which four display fields for displaying the main information are arranged in the AR image according to the embodiment.

The screen information generation unit 33 determines the arrangement of the display fields Dh in the first space SP1 based on the determined number of display fields Dh (step ST204). FIG. 11 shows the AR image when the number of display fields Dh is six. When the number of display fields Dh is four, the AR image is displayed as shown in FIG. 16. In the AR image shown in FIG. 16, since the ship name is selected as the item of the main information D1 and D2, the width of one display field Dh is large. Therefore, the number of display fields Dh arranged side by side is reduced to four.

Steps ST202 to ST204 are repeatedly executed every time the items of the main information D1 and D2 are changed in step ST201.

When the user selects the markers M1 and M2 of the water moving objects S1 and S2, the screen information generation unit 33 determines the display fields Dh for displaying the pieces of main information D1 and D2 of the water moving objects S1 and S2 (step ST205).

More specifically, the display fields Dh located closest to where lines drawn directly below in the vertical direction from the middles in the width direction of the water moving objects S1 and S2 come into contact with the first space SP1 are set as the display fields Dh which displays the pieces of main information D1 and D2 of the water moving objects S1 and S2, respectively. That is, on the screen of the AR image, when the horizontal direction is assumed to be the x-axis, the display fields Dh at the x-coordinates closest to the x-coordinates of the water moving objects S1 and S2 are set as the display fields Dh of the water moving objects S1 and S2, respectively. In addition, when the main information about another water moving object is already displayed in the display field Dh selected as described above, the next most suitable display field Dh (for example, the display field Dh of the next closest x-coordinate) is selected.

Furthermore, when pieces of main information are displayed in all display fields Dh, one of the already displayed pieces of main information is hidden, and a display field Dh in which a new piece of main information can be displayed is created. For example, the main information to be hidden may be main information displayed earliest (that is, oldest) or main information about a target having the lowest risk, or may be determined in other ways. In addition, in order to prevent specific main information from being automatically hidden, the user may perform an operation such as pinning to fix the display.

For example, the degree of risk is determined based on any combination of DCPA, TCPA, BCT, or BCR. If each element of a predetermined combination of the elements is higher than a preset threshold value, it is determined that the degree of risk is high. The combination of elements is the combination of DCPA and TCPA, the combination of BCT and the BCR, or the like.

The screen information generation unit 33 displays the pieces of main information D1 and D2 of the water moving objects S1 and S2 in the determined display fields Dh (step ST206).

When there is the water moving objects S1 and S2 having a high risk, the water moving objects S1 and S2, the markers M1 and M2, the display fields Dh of the pieces of main information D1 and D2 or the like may be visually distinguished using a prominent color or a different display mode such as blinking so that the user can easily find the high-risk targets.

Steps ST205 and ST206 shown in FIG. 15 are repeatedly executed (updated) at predetermined time intervals.

Figure 17:
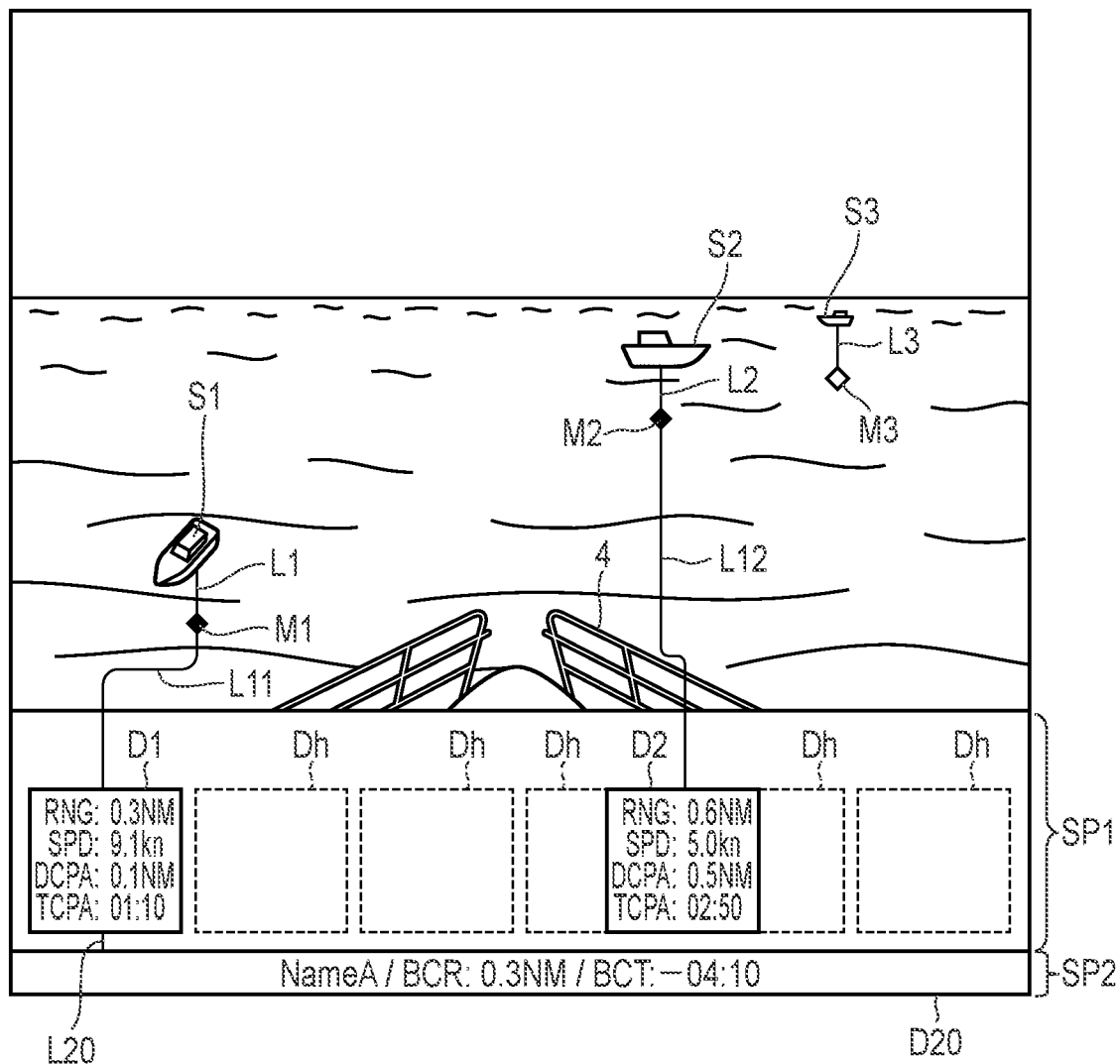
FIG. 17 is an image diagram showing the AR image after a predetermined time from a state shown in FIG. 11.

FIG. 17 shows the AR image after a predetermined time from the state of the AR image shown in FIG. 11.

The first water moving object S1 shown in FIG. 17 is moving toward the lower left of the screen of the AR image from the position of the first water moving object S1 shown in FIG. 11. The second water moving object S2 shown in FIG. 17 is moving toward the right of the screen of the AR image from the position of the second water moving object S2 shown in FIG. 11.

The main information D1 of the first water moving object S1 has moved from the second display field Dh from the left of the screen to the leftmost display field Dh since the first water moving object S1 has moved to the lower left of the screen. The main information D2 of the second water moving object S2 is in the process of moving from the fourth display field Dh from the left of the screen to the fifth display field Dh since the second water moving object S2 has moved to the right of the screen.

When the display field Dh of the main information D1 and D2 switches, the display of the main information D1 and D2 gradually moves between two display fields Dh. In this case, as is the case of the main information D2 of FIG. 17, while the display field Dh is switching, the main information D2 is displayed not only at the position of the display field Dh arranged in advance but also between the two display fields Dh.

By gradually moving the displays of the main information D1 and D2 as described above, the pieces of main information D1 and D2 are moved visually continuously. Accordingly, the user can confirm the positions of the display fields Dh after movement while visually following the pieces of main information D1 and D2. Therefore, it is possible to prevent the user from losing sight of the display positions of the main information D1, D2 or misidentify as the pieces of main information D1, D2 of other water moving objects S1 and S2 during the switching of the display fields Dh. The method of drawing such that the displays of the main information D1, D2 gradually move may be similar to the method of drawing such that the length of the correspondence line L1 gradually changes.

Note that the present embodiment may be modified as follows.

The data synthesis unit 34 may not render the three-dimensional scene data 48 and the projection screen 51 simultaneously. That is, the data synthesis unit 34 may create a two-dimensional image which is a rendering result of the three-dimensional scene data 48 (images such as the FIGS. 41f to 45f) and a two-dimensional image which is a rendering result of the projection screen 51 (a captured image of the camera 3 attached to the projection screen 51) separately. After that, the AR image is generated by synthesizing these two-dimensional images created separately. In this case, the rendering processing of the three-dimensional scene data 48 may be performed as needed according to the movement of the ship 4 or the like, and the rendering processing of the projection screen 51 may be performed at short time intervals according to the frame rate of the image by the camera 3.

The camera 3 may not include the function of performing the rotation operation such as panning or tilting, and the image capturing direction may be fixed. In this case, the image capturing direction may be fixed in any of the forward, rearward or other directions. In addition, the camera 3 may be configured to simultaneously capture an image in all directions 360 degrees around the ship 4. Furthermore, when the user performs an operation of changing the orientation of the viewpoint camera 55, the rotation operation of the camera 3 may be automatically performed so as to follow this.

The generation of the three-dimensional scene data 48 by the three-dimensional scene generation unit 32 is explained based on the configuration that the virtual reality objects 41v to 45v are arranged with reference to the bow using the position of the ship 4 as the origin as shown in FIG. 4. However, it is not limited to this. The virtual reality objects 41v to 45v may be arranged not with reference to the bow but with reference to the true north where the +z direction is the true north. In this case, when the bow direction is changed by the turning of the ship 4 or the like, instead of rearranging the virtual reality objects 41v to 45v, the orientation of the ship 4 in the three-dimensional virtual space 40 is changed to the yaw direction. The change in the position and orientation of the camera 3 at this time is simulated in the three-dimensional virtual space 40, and the position and orientation of the viewpoint camera are changed in conjunction to this, and rendering is performed. Accordingly, a rendering result can be acquired as is the case of arranging with reference to the bow.

The coordinate system of the three-dimensional virtual space 40 may use an arbitrarily selected fixed point on the earth as the origin instead of using the position of the ship as the origin, and may fix the relationship of the coordinate axes to the directions such that the +z direction is the true north and the +x direction is the true east. In this case, the coordinate system of the three-dimensional virtual space 40 is fixed on the earth, and the position and orientation where the ship 4 is arranged change based on the position information and the attitude information. Along with the change, the change in the position and orientation of the camera 3 is simulated in the three-dimensional virtual space 40.

The image generation device 1 may perform processing of reducing the swaying of the AR image caused by the swaying of the ship 4. As the processing, for example, the three-dimensional scene generation unit 32 may suppress a fluctuation in the position and orientation of the viewpoint camera 55 even when the ship 4 sways.

According to the present embodiment, the following effects can be acquired.

By changing the length of the correspondence line connecting the target and the marker so that the touch determination regions of two or more markers do not overlap, the operability for the user to select the marker can be improved.

By displaying the marker for displaying the detailed information in the vertical direction (upward direction or downward direction) of the water moving object (target), the marker in the AR image can be easily seen. For example, if the marker is displayed in the horizontal direction (rightward direction or leftward direction) of the water moving object, in the AR image, the water moving objects tend to be densely packed in the horizontal direction. Therefore, the markers overlap each other or the marker and the display of another water moving object overlap, and the markers tend to be difficult to see.

By changing the display mode of the marker (for example, the shape) according to the ship device (such as the AIS receiver 9 or the radar 12) which recognizes the target, the user can know the information source of the main information simply by looking at the marker.

By making the area of the touch determination region for determining whether or not the marker is touched larger than that of the marker including the marker, the operability of the user when selecting the marker can be improved.

By reserving a place to display the main information about each target at a predetermined place (for example, the bottom of the screen) of the AR image, the main information can be arranged in an easy-to-see manner in the AR image. In addition, by moving the display place of the corresponding main information according to the movement of the position of the target in the AR image, the correspondence relationship between the target and the main information can be easily understood.

When it is determined that a certain target has a high risk, the display of the main information about the target is distinguished so that the high-risk target or the main information of it can be visually notified to the user.

The display method of the marker and the display method of the main information and the like may be employed separately and independently, and even when either of them is employed, effects by the employed display method can be still received. In addition, when both of them are employed, further effects can be acquired by the combination.

The present invention is not limited to the above-described embodiment, and constituent elements may be deleted, added, modified and the like. In addition, the constituent elements in more than one embodiment may be combined, replaced or the like to constitute a new embodiment. Even if such an embodiment is directly different from the above-described embodiment, the embodiment having the same spirit as the present invention is considered as being explained as the embodiment of the present invention, and explanation is omitted.

What is claimed is:

1. An image generation device comprising:
   an image capturing unit installed on a water moving object;
   a target information acquisition unit which acquires target information about a target;
   an augmented image generation unit which generates an augmented image in which the target information acquired by the target information acquisition unit is displayed in a captured image captured by the image capturing unit;
   a marker display unit which displays a marker for selecting the target by a user such that the marker moves according to a display place of the target in the augmented image; and
   a marker moving unit moves the display place of at least one of a plurality of the markers so that determination regions which determining that each marker has been selected do not overlap each other.

2. The image generation device of claim 1, further comprising a first correspondence line display unit displays a first correspondence line indicating a correspondence relationship between the target and the marker.

3. The image generation device of claim 2, wherein the first correspondence line extends in a vertical direction from the display place of the target.

4. The image generation device of claim 2, wherein the marker moving unit moves the display place of the marker such that a length of the first correspondence line changes.

5. The image generation device of claim 1, wherein the marker moving unit moves the marker visually continuously.

6. The image generation device of claim 2, wherein the marker moving unit sets a length of the first correspondence line of the marker to a length with which the determination region of the marker does not overlap the determination region of another one of the markers, and sets the length of the first correspondence line to a preset length when the determination region of the marker does not overlap the determination region of another one of the markers.

7. The image generation device of claim 1, further comprising a first detailed information display unit displays first detailed information about the target corresponding to the marker selected by the user based on the target information acquired by the target information acquisition unit, wherein
   the marker display unit includes different display modes of the marker for respective types of the target information acquisition units which acquire the first detailed information to be displayed by the first detailed information display unit.

8. The image generation device of claim 1, wherein the determination region has a larger area than the marker.

9. The image generation device of claim 1, further comprising:
   a dangerous target detector which detects a dangerous target; and
   a dangerous target display unit which displays the dangerous target detected by the dangerous target detector or the target information corresponding to the dangerous target prominently.

10. The image generation device of claim 1, further comprising a first detailed information display unit which displays first detailed information about the target corresponding to the marker selected by the user in a predetermined first space of a screen on which the augmented image is displayed based on the target information acquired by the target information acquisition unit.

11. The image generation device of claim 10, further comprising a second correspondence line display unit which displays a second correspondence line indicating a correspondence relationship between the marker and the first detailed information.

12. The image generation device of claim 10, further comprising a first detailed information item selection unit which selects, by the user, an item to be the first detailed information of the target information acquired by the target information acquisition unit.

13. The image generation device of claim 12, further comprising a first display field number determination unit which determines a number of first display fields which display the first detailed information based on the item selected by the first detailed information item selection unit.

14. The image generation device of claim 10, further comprising a first display field arrangement determination unit which determines arrangement in the first space of a plurality of first display fields which display the first detailed information.

15. The image generation device of claim 14, wherein the first detailed information display unit moves a display of the first detailed information to the first display field placed in a different place according to a movement of the display place of the target in the augmented image.

16. The image generation device of claim 15, wherein the first detailed information display unit moves the display of the first detailed information visually continuously.

17. The image generation device of claim 10, further comprising:
- a first detailed information selector which selects at least one of a plurality of pieces of the first detailed information by the user; and
- a second detailed information display unit which displays second detailed information which is different information about the same target as the first detailed information selected by the first detailed information selector in a second space different from the first space based on the target information acquired by the target information acquisition unit.

18. An image generation method comprising:
- capturing an image by an image capturing unit installed on a water moving object;
- acquiring target information about a target;
- generating an augmented image in which the acquired target information is displayed in the captured image captured by the image capturing unit;
- displaying a marker for selecting the target by a user such that the marker moves according to a display place of the target in the augmented image; and
- moving the display place of at least one of a plurality of the markers so that determination regions which determining that each marker has been selected do not overlap each other.

* * * * *